(12) United States Patent
Ushigome et al.

(10) Patent No.: US 11,951,459 B2
(45) Date of Patent: Apr. 9, 2024

(54) PHOTOCATALYST, GAS SENSOR DEVICE AND GAS SENSOR

(71) Applicant: FUJITSU LIMITED, Kawasaki (JP)

(72) Inventors: Michio Ushigome, Atsugi (JP); Masato Wakamura, Sakai (JP); Osamu Tsuboi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 753 days.

(21) Appl. No.: 17/115,846

(22) Filed: Dec. 9, 2020

(65) Prior Publication Data

US 2021/0086169 A1   Mar. 25, 2021

Related U.S. Application Data

(63) Continuation of application No. PCT/JP2018/024693, filed on Jun. 28, 2018.

(51) Int. Cl.
| | | |
|---|---|---|
| *B01J 27/122* | (2006.01) | |
| *B01J 35/00* | (2006.01) | |
| *C01G 3/04* | (2006.01) | |
| *G01N 27/12* | (2006.01) | |
| *B01J 37/02* | (2006.01) | |

(52) U.S. Cl.
CPC .......... *B01J 27/122* (2013.01); *B01J 35/004* (2013.01); *C01G 3/04* (2013.01); *G01N 27/125* (2013.01)

(58) Field of Classification Search
CPC ...... B01J 27/122; B01J 35/004; B01J 35/002; B01J 37/0238; C01G 3/04; G01N 27/125
See application file for complete search history.

(56) References Cited

U.S. PATENT DOCUMENTS

| | | |
|---|---|---|
| 2003/0219624 A1 | 11/2003 | Aso et al. |
| 2005/0196620 A1 | 9/2005 | Watanabe et al. |
| 2006/0111460 A1 | 5/2006 | Wakamura et al. |
| 2006/0199729 A1 | 9/2006 | Naganuma et al. |
| 2007/0149389 A1 | 6/2007 | Kurihara et al. |
| 2007/0215006 A1 | 9/2007 | Naganuma et al. |
| 2007/0232487 A1 | 10/2007 | Naganuma et al. |
| 2010/0292075 A1 | 11/2010 | Nakano et al. |
| 2017/0160250 A1* | 6/2017 | Savoy ............... G01N 33/0036 |

(Continued)

FOREIGN PATENT DOCUMENTS

| | | |
|---|---|---|
| CN | 104959155 A | 10/2015 |
| CN | 105148951 A | 12/2015 |

(Continued)

OTHER PUBLICATIONS

Satoru et al. ("Highly selective and sensitive gas sensors for exhaled breath analysis using CuBr thin film"; Devices & Materials Laboratory, Fujitsu Laboratories Limited, 10-1 Morinosato-Wakamiya, Atsugi 243-0197, Japan, Apr. 2016 (Year: 2016).*

(Continued)

*Primary Examiner* — Herbert K Roberts
*Assistant Examiner* — Anthony W Megna Fuentes
(74) *Attorney, Agent, or Firm* — Fujitsu Intellectual Property Center

(57) ABSTRACT

A photocatalyst made of cuprous bromide, wherein the cuprous bromide expresses a photocatalytic property of decomposing a substance brought into contact with the cuprous bromide by irradiation with light.

10 Claims, 46 Drawing Sheets

(56) References Cited

U.S. PATENT DOCUMENTS

| | | |
|---|---|---|
| 2017/0299536 A1 | 10/2017 | Tsuboi et al. |
| 2018/0038822 A1 | 2/2018 | Momose et al. |

FOREIGN PATENT DOCUMENTS

| | | |
|---|---|---|
| JP | S63-158445 A | 7/1988 |
| JP | H08-245208 A | 9/1996 |
| JP | 2000-055853 A | 2/2000 |
| JP | 2000-327315 A | 11/2000 |
| JP | 2001-302220 A | 10/2001 |
| JP | 2003-175338 A | 6/2003 |
| JP | 2003-334883 A | 11/2003 |
| JP | 2005-029671 A | 2/2005 |
| JP | 2005-193231 A | 7/2005 |
| JP | 2005-200302 A | 7/2005 |
| JP | 2005-219053 A | 8/2005 |
| JP | 2005-220016 A | 8/2005 |
| JP | 2006-050992 A | 2/2006 |
| JP | 2006-197837 A | 8/2006 |
| JP | 2006-204397 A | 8/2006 |
| JP | 2006-212928 A | 8/2006 |
| JP | 2006-239514 A | 9/2006 |
| JP | 2006-265581 A | 10/2006 |
| JP | 2007-144304 A | 6/2007 |
| JP | 2007-167784 A | 7/2007 |
| JP | 2007-252983 A | 10/2007 |
| JP | 2007-260587 A | 10/2007 |
| JP | 2007-263486 A | 10/2007 |
| JP | 2008-036465 A | 2/2008 |
| JP | 2008-050275 A | 3/2008 |
| JP | 2009-233655 A | 10/2009 |
| JP | 2017-191036 A | 10/2017 |
| JP | 2017-227499 A | 12/2017 |
| JP | 2018-025412 A | 2/2018 |

OTHER PUBLICATIONS

Ru-Xin Yao et al., "A Perfectly Aligned 63 Helical Tubular Cuprous Bromide Single Crystal for Selective Photo-catalysis, Luminescence and Sensing of Nitro-explosives", Royal Society of Chemistry, Dalton Transactions 2015, vol. 44, pp. 3410-3416 (Total 13 pages) (Cited in ISR).

M. Mitani et al., "Effect of Phosphorus Ligands on the Cu(I)-catalyzed Addition Reaction of Alkyl Halide to an Electron-deficient Olefin Under Photo-Irradiation", Reaction Kinetics and Catalysis Letters, 1998, vol. 65, No. 1, pp. 101-106, ISSN: 0133-01736 (Total 7 pages) (Cited in ISR).

International Search Report and Written Opinion of the International Searching Authority (Form PCT/ISA/210, 220, and 237), mailed in connection with PCT/JP2018/024693 and dated Oct. 2, 2018 (Total 21 pages).

JPOA—Office Action of Japanese Patent Application No. 2020-526827 dated Apr. 19, 2022 with Machine Translation. References cited in the JPOA were previously submitted in the IDS filed on Dec. 9, 2020.

Extended European Search Report dated Jun. 16, 2021 for corresponding European Patent Application No. 18924125.0, 7 pages.

Japanese Office Action dated Oct. 5, 2021 for corresponding Japanese Patent Application No. 2020-526827, with English Translation, 11 pages.

\* cited by examiner

FIG. 4

$$NH_3 + O \rightarrow NH_3O$$

$$NH_3O + O \rightarrow HNO + H_2O$$

$$HNO + NH_3O \rightarrow N_2 + 2H_2O$$

$$HNO + HNO \rightarrow N_2O + H_2O$$

FIG. 26

| GROUP | REGION (1) | REGION (2) | REGION (3) |
|---|---|---|---|
| A | O | | |
| B | | O | |
| C | | | O |
| D | O | O | |
| E | | O | O |
| F | O | | O |
| G | O | O | O |

FIG. 27

| GROUP | REGION (1) | REGION (2) | REGION (3) |
|---|---|---|---|
| 1 | | | |
| 2 | ▨ | | |
| 3 | | ▨ | |
| 4 | | | ▨ |
| 5 | ▨ | ▨ | |
| 6 | ▨ | | ▨ |
| 7 | | ▨ | ▨ |
| 8 | ▨ | ▨ | ▨ |

FIG. 28

|  | REGION (1) | REGION (2) | REGION (3) |
|---|---|---|---|
| A-1 | ○ | | |
| A-2 | ○ | | |
| A-3 | ○ | | |
| A-4 | ○ | | |
| A-5 | ○ | | |
| A-6 | ○ | | |
| A-7 | ○ | | |
| A-8 | ○ | | |

FIG. 30

|     | REGION (1) | REGION (2) | REGION (3) |
|-----|------------|------------|------------|
| B-1 |            | ○          |            |
| B-2 | ▨          | ○          |            |
| B-3 |            | ▨ ○        |            |
| B-4 |            | ○          | ▨          |
| B-5 | ▨          | ▨ ○        |            |
| B-6 | ▨          | ○          | ▨          |
| B-7 |            | ▨ ○        | ▨          |
| B-8 | ▨          | ▨ ○        | ▨          |

FIG. 32

|     | REGION (1) | REGION (2) | REGION (3) |
|-----|------------|------------|------------|
| C-1 |            |            | ○          |
| C-2 | ▒▒▒        |            | ○          |
| C-3 |            | ▒▒▒        | ○          |
| C-4 |            |            | ▒○▒        |
| C-5 | ▒▒▒        | ▒▒▒        | ○          |
| C-6 | ▒▒▒        |            | ▒○▒        |
| C-7 |            | ▒▒▒        | ▒○▒        |
| C-8 | ▒▒▒        | ▒▒▒        | ▒○▒        |

FIG. 34

|  | REGION (1) | REGION (2) | REGION (3) |
|---|---|---|---|
| D-1 | ○ | ○ |  |
| D-2 | ○ | ○ |  |
| D-3 | ○ | ○ |  |
| D-4 | ○ | ○ |  |
| D-5 | ○ | ○ |  |
| D-6 | ○ | ○ |  |
| D-7 | ○ | ○ |  |
| D-8 | ○ | ○ |  |

FIG. 36

|  | REGION (1) | REGION (2) | REGION (3) |
|---|---|---|---|
| E-1 |  | ○ | ○ |
| E-2 | ▓ | ○ | ○ |
| E-3 |  | ○ | ○ |
| E-4 |  | ○ | ○ |
| E-5 | ▓ | ○ | ○ |
| E-6 | ▓ | ○ | ○ |
| E-7 |  | ○ | ○ |
| E-8 | ▓ | ○ | ○ |

FIG. 38

|  | REGION (1) | REGION (2) | REGION (3) |
|---|---|---|---|
| F-1 | ◯ |  | ◯ |
| F-2 | ◯ |  | ◯ |
| F-3 | ◯ |  | ◯ |
| F-4 | ◯ |  | ◯ |
| F-5 | ◯ |  | ◯ |
| F-6 | ◯ |  | ◯ |
| F-7 | ◯ |  | ◯ |
| F-8 | ◯ |  | ◯ |

FIG. 40

|  | REGION (1) | REGION (2) | REGION (3) |
|---|---|---|---|
| G-1 | ○ | ○ | ○ |
| G-2 | ○ | ○ | ○ |
| G-3 | ○ | ○ | ○ |
| G-4 | ○ | ○ | ○ |
| G-5 | ○ | ○ | ○ |
| G-6 | ○ | ○ | ○ |
| G-7 | ○ | ○ | ○ |
| G-8 | ○ | ○ | ○ | though

PHOTOCATALYST, GAS SENSOR DEVICE AND GAS SENSOR

CROSS-REFERENCE TO RELATED APPLICATION

This application is a continuation application of International Application PCT/JP2018/024693 filed on Jun. 28, 2018 and designated the U.S., the entire contents of which are incorporated herein by reference.

FIELD

The embodiment relates to a photocatalyst, a gas sensor device, a gas sensor, and a measuring method.

BACKGROUND

Currently, gas sensors are installed in various electric appliances and systems, and are extremely important devices.

Related art is disclosed in Japanese Laid-open Patent Publication No. 2000-327315, Japanese Laid-open Patent Publication No. 2005-193231, Japanese Laid-open Patent Publication No. 2001-302220, Japanese Laid-open Patent Publication No. 2003-175338, Japanese Laid-open Patent Publication No. 2003-334883, Japanese Laid-open Patent Publication No. 2005-029671, Japanese Laid-open Patent Publication No. 2005-200302, Japanese Laid-open Patent Publication No. 2005-219053, Japanese Laid-open Patent Publication No. 2005-220016, Japanese Laid-open Patent Publication No. 2006-50992, Japanese Laid-open Patent Publication No. 2006-197837, Japanese Laid-open Patent Publication No. 2006-204397, Japanese Laid-open Patent Publication No. 2006-212928, Japanese Laid-open Patent Publication No. 2006-239514, Japanese Laid-open Patent Publication No. 2006-265581, Japanese Laid-open Patent Publication No. 2007-167784, Japanese Laid-open Patent Publication No. 2007-252983, Japanese Laid-open Patent Publication No. 2007-260587, Japanese Laid-open Patent Publication No. 2007-263486, Japanese Laid-open Patent Publication No. 2008-36465, Japanese Laid-open Patent Publication No. 2008-50275, Japanese Laid-open Patent Publication No. 08-245208 and Japanese Laid-open Patent Publication No. 2007-144304.

SUMMARY

According to an aspect of the embodiments, a photocatalyst is made of cuprous bromide which expresses a photocatalytic property of decomposing a substance brought into contact with the cuprous bromide by irradiation with light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of decomposition of $NH_3$ by CuBr forming the photocatalyst according to this embodiment.

FIG. 26 is a diagram for illustrating a method of defining a UV irradiation timing in the measurement sequence included in the gas concentration measurement sequence of the gas sensor according to this embodiment.

FIG. 27 is a diagram for illustrating a method of defining a gas introduction timing in the measurement sequence included in the gas concentration measurement sequence of the gas sensor according to this embodiment.

FIG. 28 is a diagram for illustrating a plurality of measurement patterns A-1 to A-8 included in a group A which forms the measurement sequence included in the gas concentration measurement sequence of the gas sensor according to this embodiment.

FIG. 30 is a diagram for illustrating a plurality of measurement patterns B-1 to B-8 included in a group B which forms the measurement sequence included in the gas concentration measurement sequence of the gas sensor according to this embodiment.

FIG. 32 is a diagram for illustrating a plurality of measurement patterns C-1 to C-8 included in a group C which forms the measurement sequence included in the gas concentration measurement sequence of the gas sensor according to this embodiment.

FIG. 34 is a diagram for illustrating a plurality of measurement patterns D-1 to D-8 included in a group D which forms the measurement sequence included in the gas concentration measurement sequence of the gas sensor according to this embodiment.

FIG. 36 is a diagram for illustrating a plurality of measurement patterns E-1 to E-8 included in a group E which forms the measurement sequence included in the gas concentration measurement sequence of the gas sensor according to this embodiment.

FIG. 38 is a diagram for illustrating a plurality of measurement patterns F-1 to F-8 included in a group F which forms the measurement sequence included in the gas concentration measurement sequence of the gas sensor according to this embodiment.

FIG. 40 is a diagram for illustrating a plurality of measurement patterns G-1 to G-8 included in a group G which forms the measurement sequence included in the gas concentration measurement sequence of the gas sensor according to this embodiment.

DESCRIPTION OF EMBODIMENTS

There are various applications; for example, this is also used as a gas concentration measuring device in a surrounding environment, a gas alarm, and the like.

Figure 46:
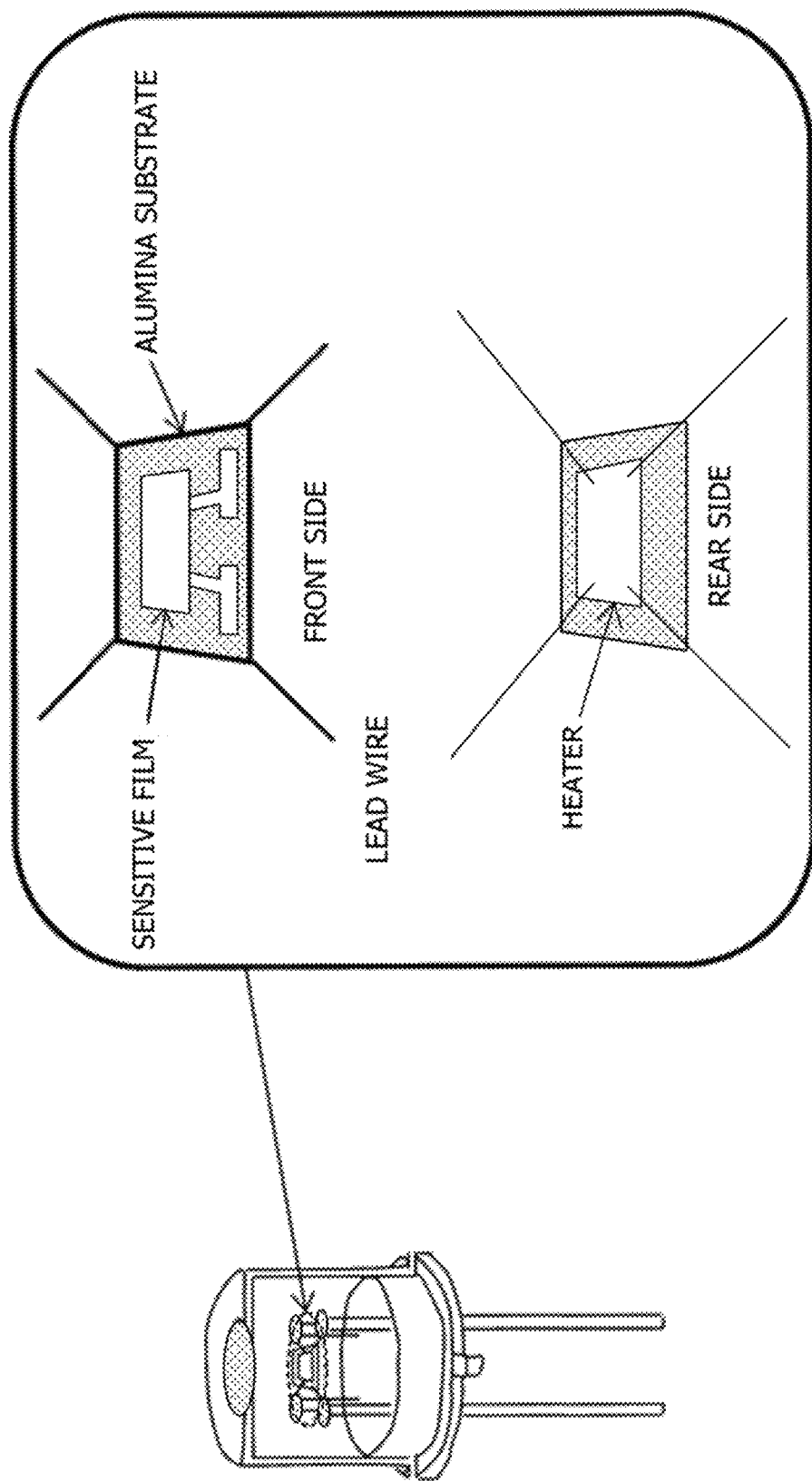
FIG. 46 is a schematic diagram illustrating a conventional gas sensor.

Although there are several types of gas sensors depending on difference in detection methods, a gas sensor using an oxide semiconductor as a sensitive film, especially, a gas sensor using tin oxide as a sensitive film material is most widely used (refer to, for example, FIG. 46).

Furthermore, as a material having a photocatalytic property, titanium oxide ($TiO_2$) and titanium apatite based on calcium hydroxyapatite are known.

By the way, in a case of measuring a concentration of a target gas contained in surrounding air, for example, using a gas sensor, the concentration of the target gas is obtained based on a sensor resistance when the target gas is not contained and the sensor resistance when the target gas is contained.

For example, in a case of repeatedly measuring the concentration of the target gas, the sensor resistance when the target gas is not contained and the sensor resistance when the target gas is contained are repeatedly obtained.

However, when obtaining the sensor resistance when the target gas is not included after obtaining the sensor resistance when the target gas is included, it takes a long time for desorbing gas molecules on a surface of the gas sensor device and there is a problem that a measuring time becomes long.

Note that, here, a fact that it takes a long time to desorb the gas molecules on the surface of the gas sensor device, in other words, to decompose a decomposition target in the gas sensor is described as a problem, but there is no limitation.

For example, also in other devices such as a water purifier, sewage purifier, air cleaner, air conditioner, and exhaust gas purifier, there is a problem that it takes a long time to decompose the decomposition target.

The time required to decompose the decomposition target may be shorten.

A photocatalyst, a gas sensor device, a gas sensor, and a measuring method according to an embodiment of the present invention are hereinafter described with reference to the drawings FIGS. 1 to 45.

Figure 1:
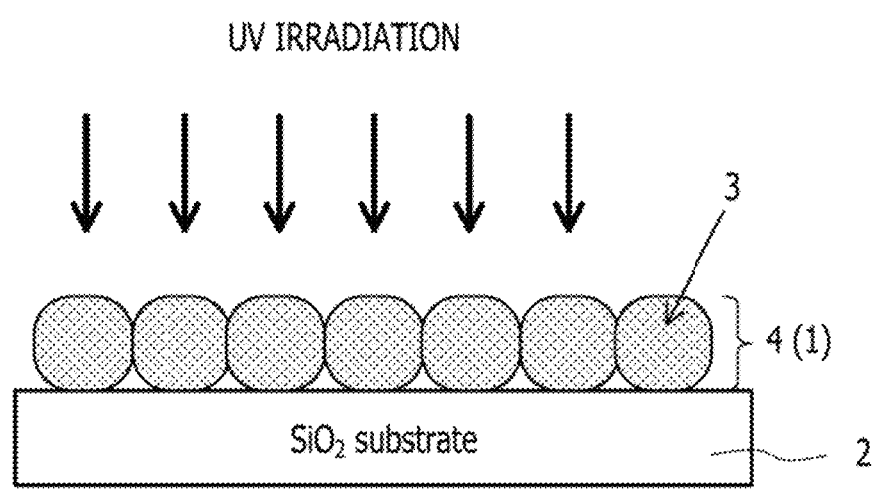
FIG. 1 is a schematic diagram illustrating a cuprous bromide (CuBr) film making a photocatalyst according to this embodiment.

The photocatalyst according to this embodiment is a photocatalyst 1 made of cuprous bromide (CuBr) in which CuBr expresses a photocatalytic property of decomposing a substance brought into contact with CuBr by irradiation with light (refer to FIG. 1). In this case, a photocatalytic material is CuBr.

Here, CuBr is an ionic crystal composed of monovalent copper and monovalent bromine, a polycrystalline body including at least mainly (111)-oriented components.

This is based on a discovery that CuBr has the photocatalytic property as described below; the photocatalyst 1 made of CuBr is a novel photocatalyst, and CuBr is a novel photocatalytic material.

A mechanism of photocatalytic property expression is considered as follows.

When this absorbs light energy having a wavelength corresponding to a band gap between a valence band and a conduction band, electrons in the valence band migrate to the conduction band by excitation, and holes are generated in the valence band.

Assuming that a certain substance (for example, an organic substance) is adsorbed to a surface of a substance in the conduction band, the electrons migrating to this migrate to the organic substance on the surface and reduce the same, and in the valence band, the holes generated there take the electrons and oxidize the organic substance.

Especially, titanium oxide in which holes in a valence band have very strong oxidizing power finally decomposes an organic substance into water and carbon dioxide.

That is, a material having a band gap corresponding to energy of irradiation light (for example, ultraviolet light), having long-life electrons and holes generated, and having a strong redox power becomes the photocatalytic material.

The present inventor confirmed that CuBr has the photocatalytic property in the following manner.

The present inventor discovered the photocatalytic property of CuBr from a fact that sensor resistance drops only at the time of ultraviolet irradiation during other experiments.

Therefore, the inventor evaluated photocatalytic activity anew by the following method, and confirmed that CuBr has the photocatalytic property.

First, a wavelength of light (ultraviolet light) for expressing the photocatalytic property was obtained as follows.

Since a band gap of CuBr is Eg=3.1 eV (for example, refer to K. V. Rajani, S. Daniels, M. Rahman, A. Cowley, and P. J. McNally, "Deposition of earth-abundant p-type CuBr films with high hole conductivity and realization of p-CuBr/n-Si heterojunction solar cell", *Materials Letter*, 111, pp. 63-66, 2013), when the wavelength is obtained by substituting this into following expression (1), λ=405 nm is obtained.

[Mathematical expression 1]

$$E = hv = \frac{hC}{\lambda} = \frac{1240}{\lambda} \quad (1)$$

Therefore, CuBr may express the photocatalytic property by irradiation with light (ultraviolet light; near-ultraviolet light) having a wavelength of 405 nm.

From this, it was found that it is sufficient to use a light source including a component having the wavelength of 405 nm in the following evaluation.

First, evaluation according to JIS R 1701-2, in other words, confirmation of the photocatalytic property by a JIS R 1701-2 test was performed.

In a sealed desiccator, a sample obtained by depositing a CuBr film (CuBr thin film) 4 formed of CuBr crystal grains 3 on a Si substrate 2 including a $SiO_2$ film was placed, then acetaldehyde ($CH_3CHO$) vapor was introduced until a gas phase concentration reached about 10,000 ppm, and this was left for about one hour as illustrated in FIG. 1.

During this time, the desiccator is shielded so that external light does not enter.

Next, from above the desiccator, ultraviolet light with a light amount of about 3 $mW/cm^2$ and a central wavelength of about 360 nm was applied (UV irradiation) four about four hours as illustrated in FIG. 1 and concentrations of acetaldehyde gas and carbon dioxide gas ($CO_2$) generated by decomposition of the same in the desiccator were measured by gas chromatography.

Figure 2A:
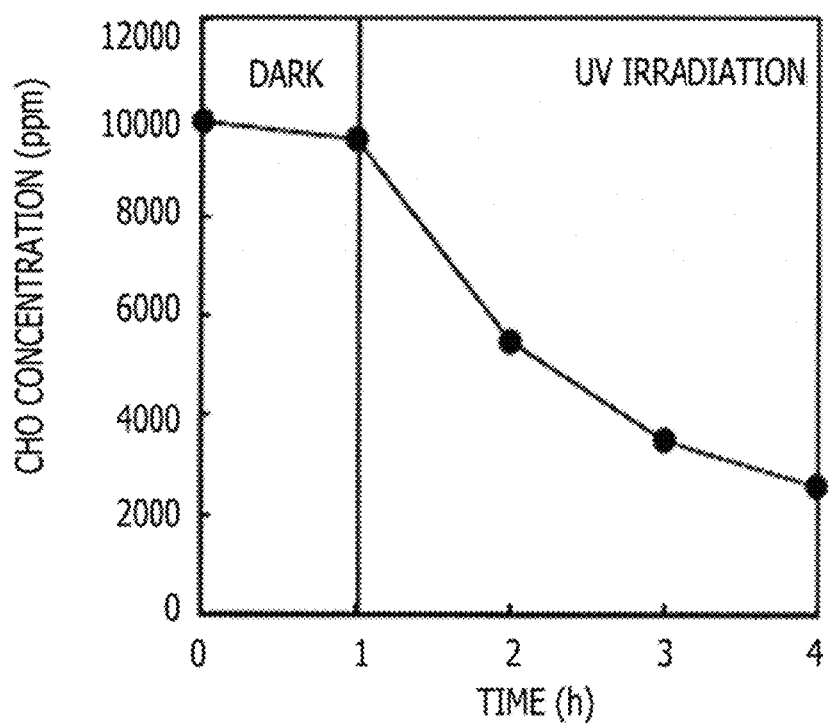
FIGS. 2A and 2B are diagrams illustrating results of confirmation of a photocatalytic property by a JIS R 1701-2 test as for the CuBr film forming the photocatalyst according to this embodiment.
Figure 2B:
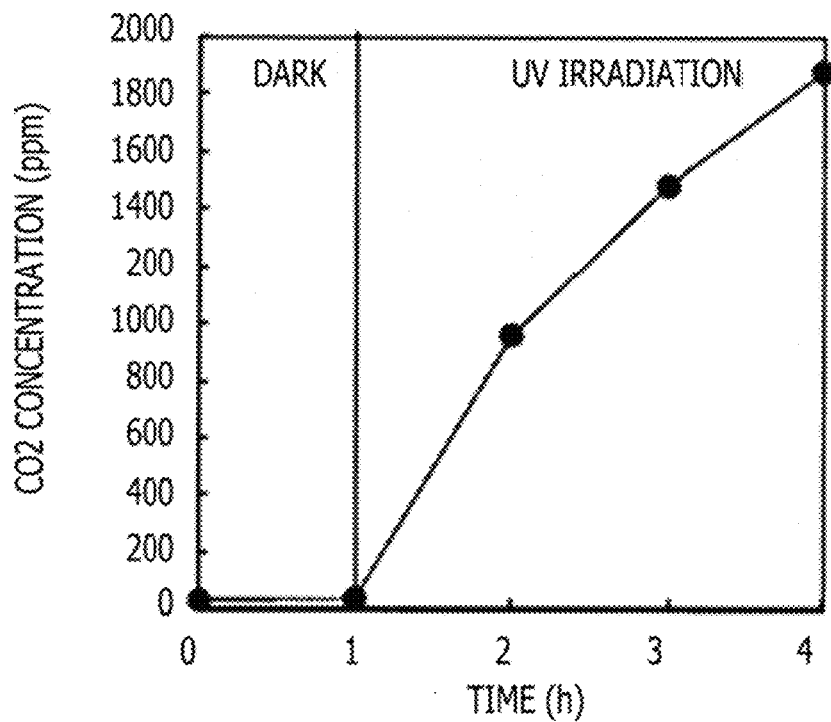

Here, FIGS. 2A and 2B illustrate results thereof.

As illustrated in FIG. 2A, it is understood that the concentration of acetaldehyde gas sharply decreases after the ultraviolet light irradiation starts to be about one-fourth in about four hours.

In contrast, as illustrated in FIG. 2B, it is understood that carbon dioxide sharply increases at the same time as the ultraviolet irradiation.

This indicates that acetaldehyde added in the sealed desiccator is decomposed into carbon dioxide.

Therefore, it was confirmed that CuBr certainly has the photocatalytic property.

Note that, a slight decrease in the acetaldehyde gas concentration during a dark period before the UV irradiation is considered to be due to adsorption to an inner wall of a chamber.

Next, evaluation by surface analysis, in other words, X-ray photoelectron spectroscopy (XPS) analysis of the surface of the CuBr film 4 in a case without the near-ultraviolet light irradiation and with the near-ultraviolet light irradiation was performed.

In order to guarantee a catalytic property, it is necessary that a material itself does not change before and after reaction.

That is, in order to confirm the photocatalytic property, it is necessary to compare before and after the ultraviolet light irradiation to confirm that the composition of the CuBr film 4 does not change.

In order to confirm a change of the surface of the CuBr film 4 due to the ultraviolet light irradiation (near-ultraviolet light irradiation), a surface of a sample in which the CuBr thin film 4 is irradiated with LED ultraviolet light (center wavelength of 405 nm) for about 10 seconds×11 times (#75C3) and a surface of a sample without the irradiation (#75D3) were analyzed by XPS, respectively, to compare the compositions.

Figure 3A:
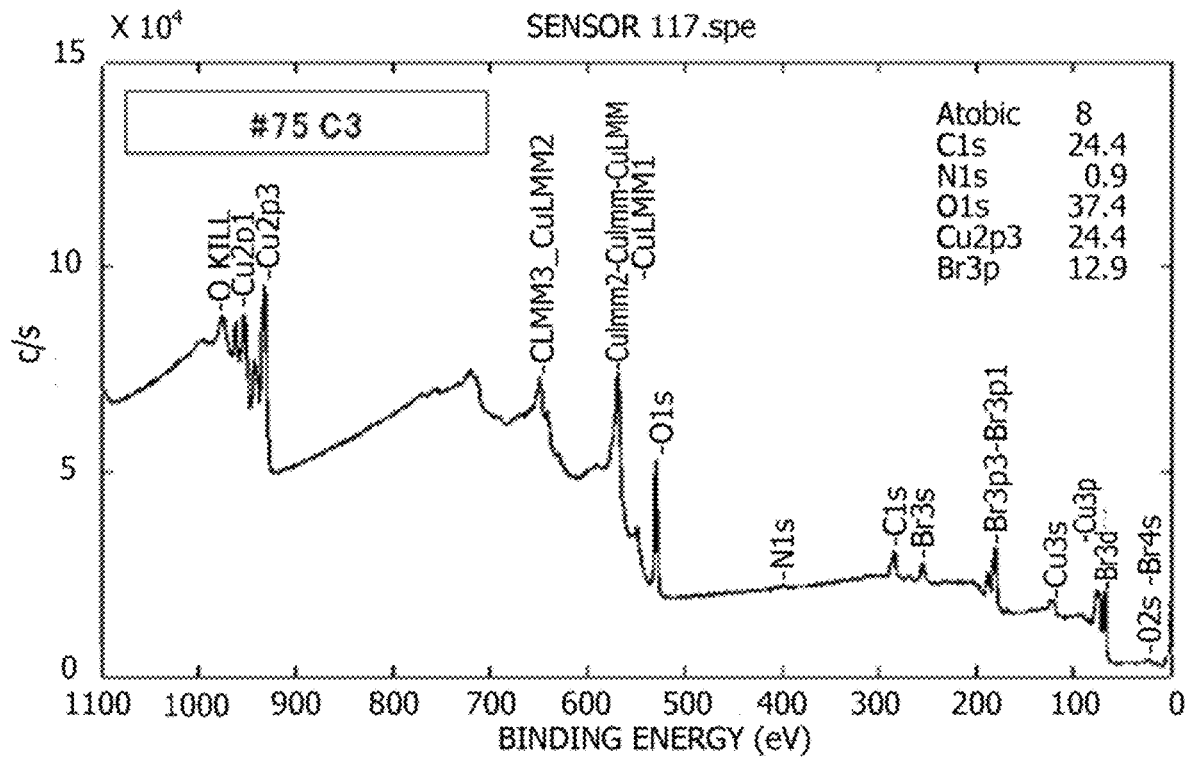
FIGS. 3A and 3B are diagrams illustrating results of XPS analysis of a surface of the CuBr film forming the photocatalyst according to this embodiment in a case where this is irradiated with near-ultraviolet light and in a case where this is not irradiated with the same.
Figure 3B:
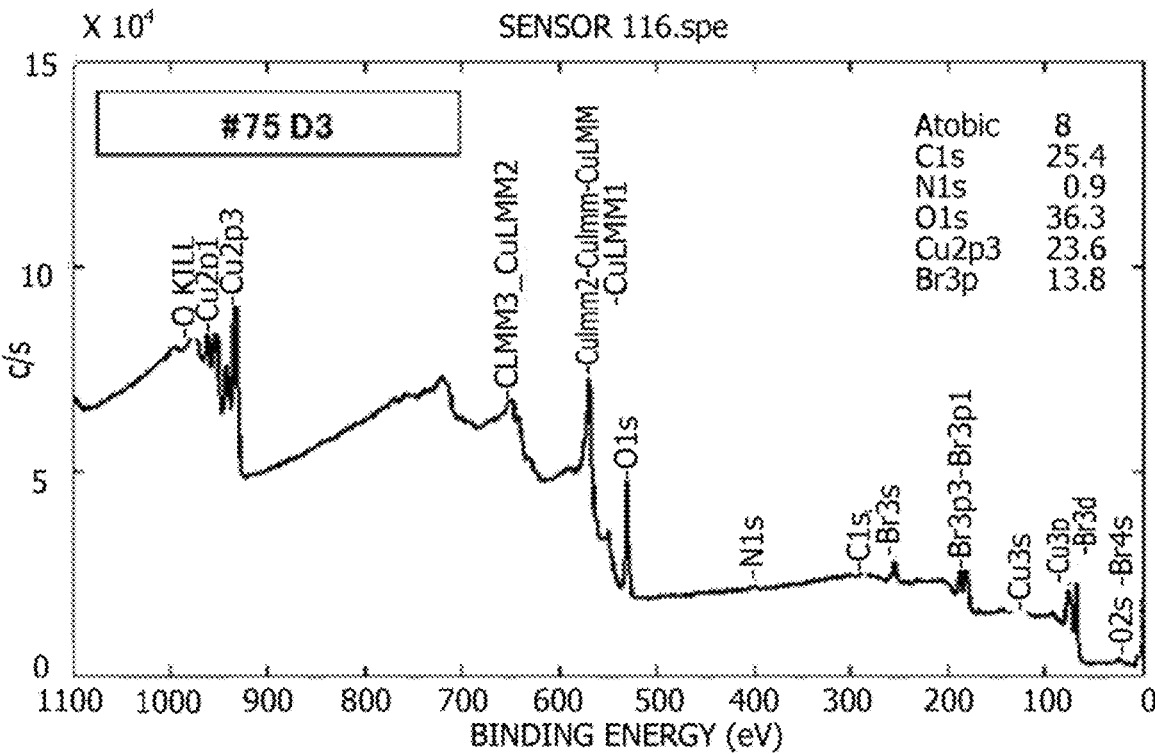

Here, FIGS. 3A and 3B illustrate results thereof.

Note that, quantitative analysis results are illustrated in an upper right portion in FIGS. 3A and 3B.

As illustrated in FIGS. 3A and 3B, elements detected in the sample irradiated with the ultraviolet light and the sample without the irradiation were C, N, O, Cu, and Br, and other elements were not detected. There was no difference in each composition ratio before and after the ultraviolet light irradiation.

Therefore, it was considered that the composition of the surface of the CuBr film 4 does not change before and after the ultraviolet light irradiation, and it was confirmed that CuBr certainly serves as a catalyst.

As described above, it was confirmed that CuBr has the photocatalytic property by the above-described two types of evaluation.

Light necessary for expression of the photocatalytic activity of CuBr is not especially limited as long as this is light having the wavelength of about 410 nm or shorter, and may be appropriately selected according to a purpose.

That is, the photocatalytic property of CuBr may be expressed by the irradiation with light including ultraviolet rays (ultraviolet light), preferably by the irradiation with light including near-ultraviolet rays (near-ultraviolet light).

Here, the ultraviolet rays are light having a wavelength of about 10 nm to about 410 nm, and the near-ultraviolet rays are light having a wavelength of about 320 nm to about 410 nm.

In consideration of a light source cost and the like, the irradiation of near-ultraviolet rays having a wavelength of about 380 nm to about 410 nm is preferable.

For example, by using a UV-LED, advantages such as small size, light weight, low cost, safety, and easy handling may be obtained.

Furthermore, a target to be decomposed by CuBr by its photocatalytic property is not especially limited and may be appropriately selected according to the purpose.

For example, as a component, it is reported that specific inorganic substances, for example, $NH_3$, in addition to organic substances such as proteins, amino acids, lipids, and sugars, are decomposed (refer to, for example, FIG. 4; refer to, for example, H. Mozzanega et al., "NH3 Oxidation over UV-Irradiated TiO2 at Room Temperature", *The Journal of Physical Chemistry*, Vol. 83, No. 17, pp. 2251-2255, 1979).

Note that, the decomposition target may include one type alone or two or more types of them.

Furthermore, specific examples of the decomposition target generally include dirty components derived from human skin, dirt, dust, sludge, unnecessary components, waste liquid components, harmful components in soil or air, microorganisms, viruses, and the like.

Here, examples of the harmful component include acetaldehyde gas and the like, for example.

The microorganisms are not especially limited and may be any of prokaryote or eukaryote, and protozoa are also included; examples of the prokaryote include bacteria such as *Escherichia coli, Staphylococcus aureus*, and the like, for example, and examples of the eukaryote include yeast fungi, filamentous bacteria such as molds, actinomycetes, and the like, for example.

Examples of viruses include, for example, DNA viruses, RNA viruses, and the like, and specific examples include influenza viruses and the like.

Furthermore, the decomposition target may be present in any of solid, liquid, and gas aspects.

For example, as a case of presenting in the liquid aspect, there is a case where the decomposition target is present in liquids such as a waste liquid, a nutritious liquid, and a circulating liquid, for example.

In this case, by putting CuBr having the photocatalytic property described above, in other words, the photocatalyst made of CuBr in such liquid and irradiating the same with light (ultraviolet light), the decomposition target included therein may be decomposed, and further, a time required for decomposing the decomposition target may be shortened.

That is, CuBr having the photocatalytic property described above, in other words, the photocatalyst made of CuBr may be applied to a water purifier, a sewage purifier, or the like, for example, and it is possible to decompose the decomposition target included in the waste liquid, the circulating liquid, and the like, for example, by irradiating the same with the light (ultraviolet light), and further it is possible to shorten the time required for decomposing the decomposition target.

Furthermore, as a case of presenting in the gas aspect, there is a case where the decomposition target is present in gases such as air, exhaust gas, and circulating gas, for example.

In this case, by putting CuBr having the photocatalytic property described above, in other words, the photocatalyst made of CuBr in such gas and irradiating the same with light (ultraviolet light), the decomposition target included therein may be decomposed, and further, a time required for decomposing the decomposition target may be shortened.

That is, CuBr having the photocatalytic property described above, in other words, the photocatalyst made of CuBr may be applied to an air cleaner, an air conditioner, an exhaust gas purifier, and the like, for example, and it is possible to decompose the decomposition target included in the air, exhaust gas, circulating gas, and the like, for example, by irradiating the same with the light (ultraviolet light), and further, a time required for decomposing the decomposition target may be shortened.

In this manner, a device such as the water purifier, sewage purifier, air cleaner, air conditioner, and exhaust gas purifier, for example, may be configured as that provided with CuBr having the photocatalytic property described above, in other words, the photocatalyst made of CuBr.

In this case, for example, the device such as the water purifier, sewage purifier, air cleaner, air conditioner, and exhaust gas purifier may be made of CuBr, and may be provided with the photocatalyst in which CuBr expresses the photocatalytic property of decomposing the substance brought into contact with CuBr by the light irradiation, and the light source which irradiates the photocatalyst with light.

Here, the light source is only required to be a light source having a wavelength at which CuBr becomes photocatalytically active, and to be a light source capable of applying light including light having a wavelength of about 410 nm or shorter. For example, the UV-LED and the like may be used.

For example, the air cleaner may be provided with the photocatalyst made of CuBr in which CuBr expresses the photocatalytic property of decomposing the substance brought into contact with CuBr by the irradiation with light, and a mechanism which irradiates the photocatalyst with light having a wavelength necessary for expressing a function of this photocatalyst.

Furthermore, for example, the water purifier may be provided with the photocatalyst made of CuBr in which CuBr expresses the photocatalytic property of decomposing the substance brought into contact with CuBr by the irradiation with light, and a mechanism which irradiates the photocatalyst with light having a wavelength necessary for expressing a function of this photocatalyst.

By the way, CuBr has the photocatalytic property as described above, and also has a gas-sensitive property as a sensitive film of a gas sensor having characteristics such as high sensitivity and high selectivity to ammonia gas (refer to, for example, Michio USHIGOME, Kazuaki KARASAWA, Satoru MOMOSE, Ryozo TAKASU, and Osamu TSUBOI, "Development of portable breath sensor for measuring ammonia component in breath in short time", IEEJ, The 33rd "Sensor Symposium on Sensors, Micromachines and Applied Systems" Proceedings, 25am2-PS-079, (2016)).

It is possible to realize a gas sensor with a shortened measuring time (time required for measurement; here mainly recovery time) by configuring an ammonia gas sensor by using CuBr having the photocatalytic property described above by utilizing these two properties.

Note that, there is no limitation, and CuBr having the photocatalytic property described above may also be used for gas sensors other than the ammonia gas sensor.

For example, this may also be used as a gas sensor (gas sensor for medical and health care use) which specifies components of biological gas (for example, exhaled breath, body odor, urine, fart, and feces) released from body or excrement of human, animal, and the like.

Figure 7:
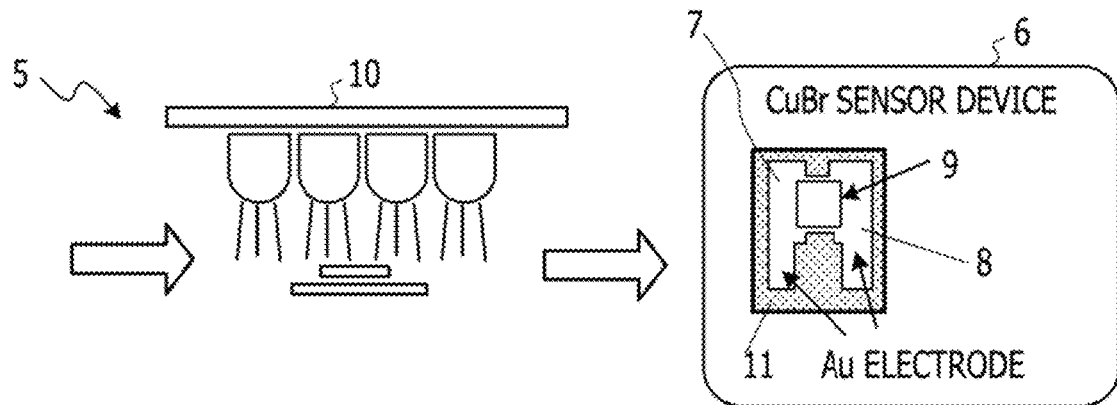
FIG. 7 is a schematic diagram illustrating a configuration of the gas sensor according to this embodiment.

In this case, as illustrated in FIG. 7, a gas sensor device 6 provided on a gas sensor 5 may be provided with a first electrode 7, a second electrode 8, and a sensitive film 9 connecting the first electrode 7 and the second electrode 8, the sensitive film 9 may be made of CuBr, and CuBr may express the photocatalytic property of decomposing the substance brought into contact with CuBr by the irradiation with light.

In this case, the sensitive film 9 is a CuBr film. Furthermore, the gas sensor device 6 is also referred to as a CuBr sensor device. Furthermore, the first electrode 7 and the second electrode 8 are, for example, Au electrodes.

Then, the gas sensor 5 may be provided with the gas sensor device 6 configured in this manner and a light source 10 which irradiates the sensitive film 9 of the gas sensor device 6 with light.

Here, the light source 10 is only required to be the light source which applies light including a wavelength component in an ultraviolet light region (near-ultraviolet light region), and for example, the UN-LED may be used.

For example, it is possible to form the gas sensor device 6 obtained by forming a thin film (CuBr film; CuBr thin film) 9 made of CuBr which expresses the photocatalytic property of decomposing a substance brought into contact with the same by irradiation with light so as to straddle two Au electrodes (first and second electrodes 7 and 8) formed on a substrate 11 including a Si thermal oxide film as the sensitive film 9 to ammonia gas.

Then, the gas sensor 5 may be provided with the gas sensor device 6 configured in this manner and a light irradiation mechanism (here, an ultraviolet light irradiation mechanism; light source 10; for example, UV-LED) which irradiates a sensitive film surface with light of a wavelength necessary for expressing a photocatalyst function.

For example, in a conventional gas sensor provided with not the light source 10 such as the UV-LED but the CuBr sensor device 6, the gas sensor device 6 is exposed to a measuring target gas to measure a gas concentration, then it is switched to dean air in preparation for next measurement, and increased resistance (sensor resistance) of the gas sensor device 6 is returned to its original value to initialize.

Figure 6:
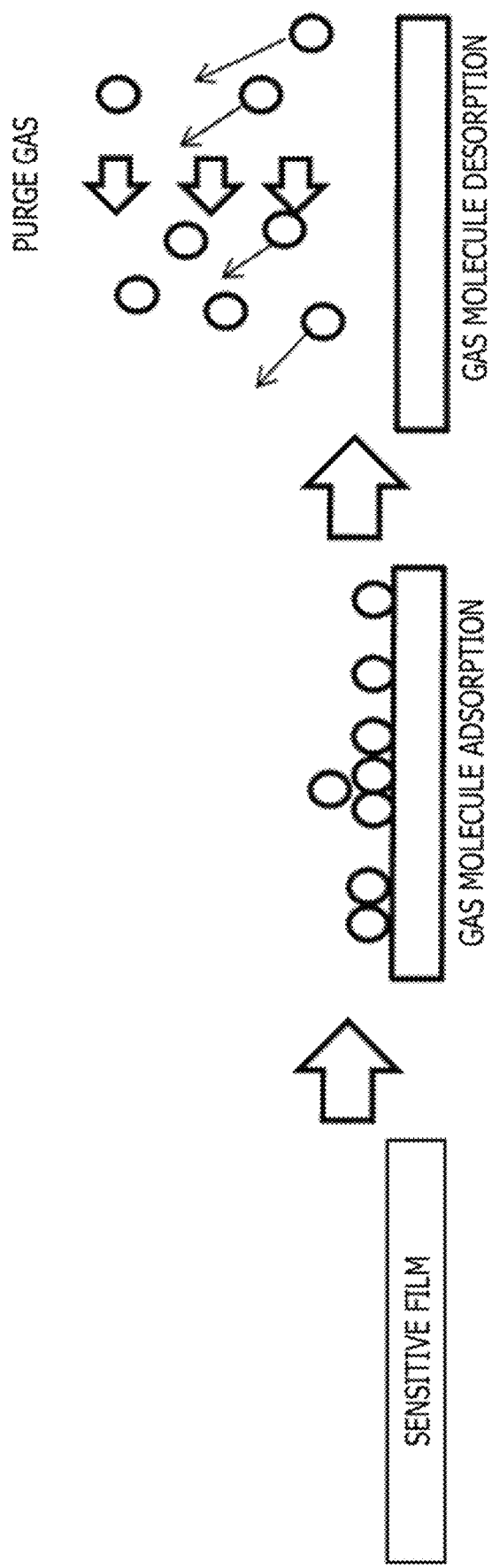
FIG. 6 is a diagram illustrating adsorption and desorption of gas molecules to and from the sensitive film at the time of gas response and recovery in the gas sensor.

That is, when the gas sensor device 6 is exposed to the measuring target gas, gas molecules are adsorbed to the surface of the sensitive film (CuBr film) 9 of the gas sensor device 6, so that by introducing dean air (purge gas) after measuring the gas concentration in this state, the gas molecules are desorbed from the surface of the sensitive film 9 and the surface is returned to its original state (refer to, for example, FIG. 6).

Figure 5:
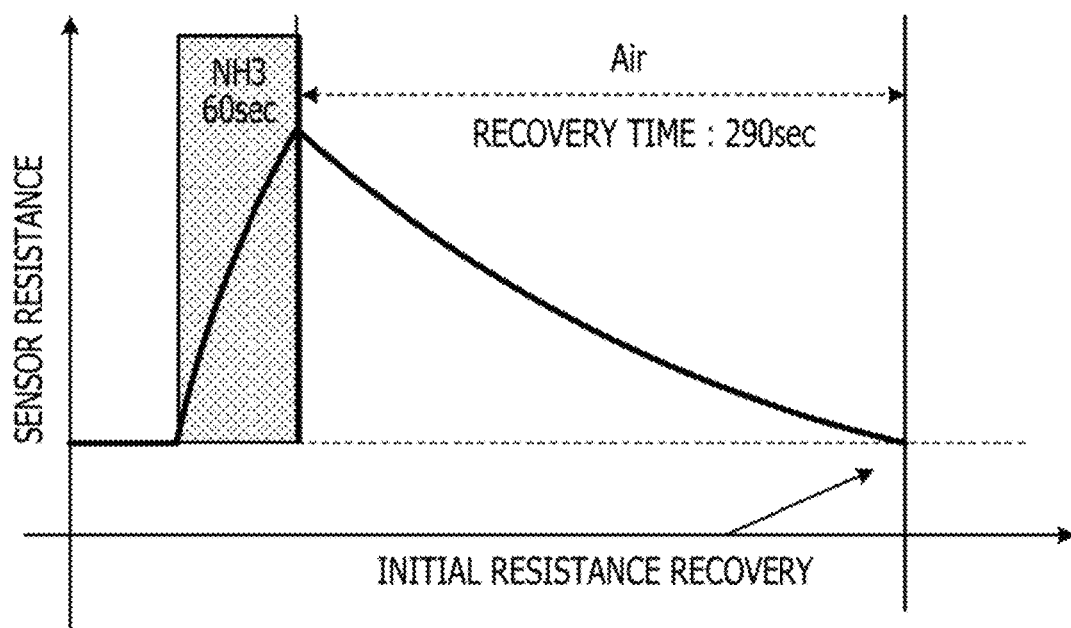
FIG. 5 is a diagram illustrating an example of a change in sensor resistance at the time of gas response and recovery in a conventional gas sensor not provided with a light source.

Here, FIG. 5 illustrates an example of a change in sensor resistance in the conventional gas sensor provided with not the light source 10 such as the UV-LED, for example, but the CuBr sensor device 6.

As illustrated in FIG. 5, a measuring time of ammonia gas (ammonia gas exposure time) is about 60 seconds, whereas a recovery time until it recovers to initial resistance by introduction of dean air (Air) is about 290 seconds; the recovery time is about five times longer than the measuring time (ammonia gas exposure time).

Figure 8:
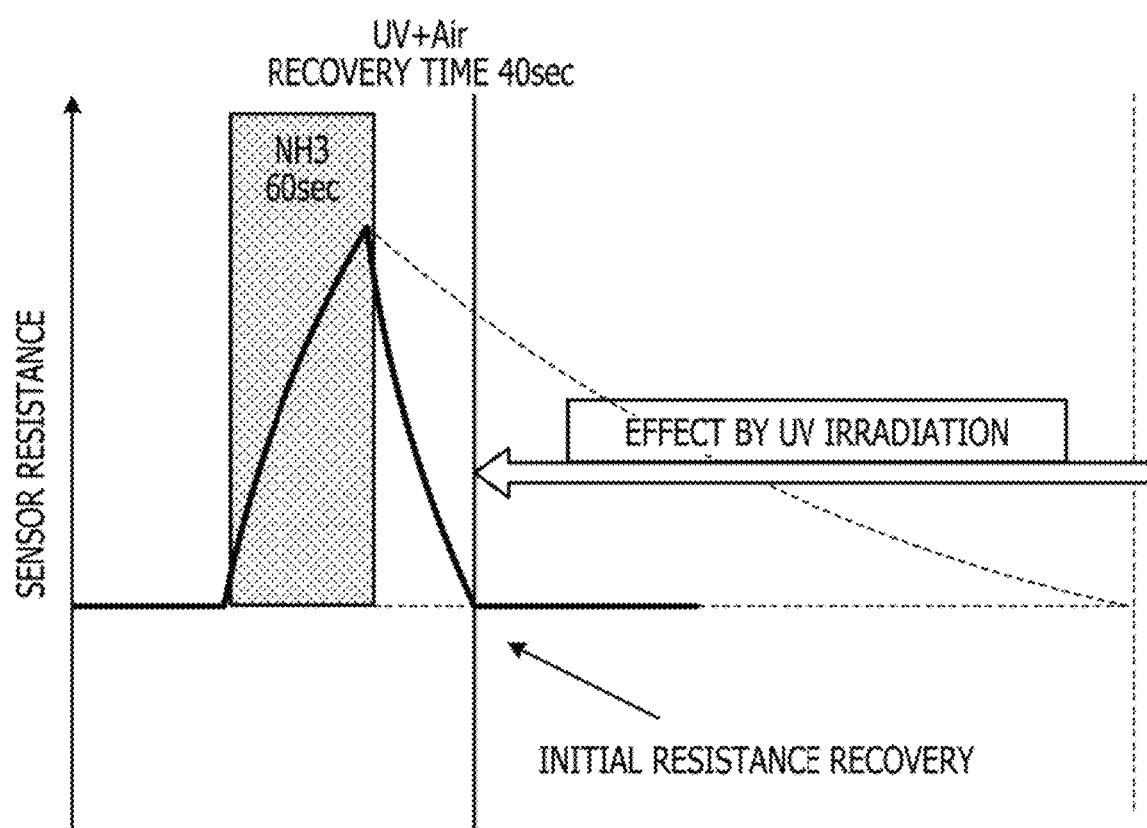
FIG. 8 is a diagram illustrating an example of a change in sensor resistance at the time of gas response and recovery in a gas sensor according to this embodiment.

In contrast, as described above, when installing the ultraviolet light irradiation mechanism (light source 10; here UV-LED) directly above the sensitive film 9 of the gas sensor device 6 (refer to, for example, FIG. 7) and applying UV in the recovery time after measuring the gas, the change in sensor resistance is as illustrated in FIG. 8 as an example.

As illustrated in FIG. 8, the recovery time becomes about one-seventh from about 290 seconds to about 40 seconds, so that it becomes possible to recover in a time shorter than the measuring time of ammonia gas (ammonia gas exposure time; here about 60 seconds).

Furthermore, by introducing dean air, the gas molecules attached (adsorbed) to the surface of the sensitive film 9 (film made of a gas-sensitive material; here, CuBr film) of the gas sensor device 6 are spontaneously desorbed to initialize.

In contrast, in this embodiment, since the gas molecules are forcibly decomposed and desorbed by the irradiation of ultraviolet rays, it is not necessary to introduce clean air by using a filter and the like, and it is sufficient, for example, to introduce outside air without using a filter.

Note that, although it is possible to desorb the gas molecules by the irradiation of ultraviolet rays, it is preferable to introduce dean air or outside air in order to prevent re-adsorption.

Figure 9:
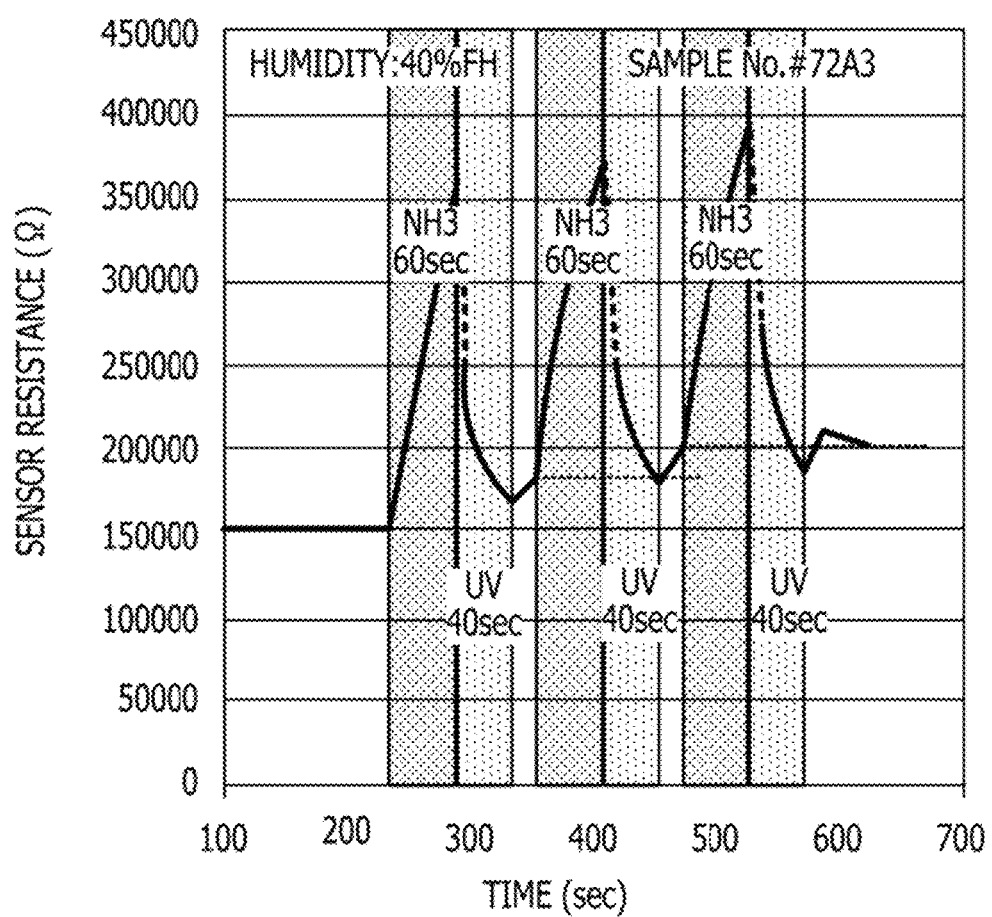
FIG. 9 is a diagram illustrating a result of actual measurement of gas concentration using the gas sensor according to this embodiment.

Here, FIG. 9 illustrates an example in which the concentration of ammonia gas is actually measured three times in succession.

Since the recovery time may be shortened by configuring in the above-described manner and performing the UV irradiation during the recovery time, it becomes possible to measure the concentration of ammonia gas successively as illustrated in FIG. 9.

Although the ultraviolet light irradiation (preferably near-ultraviolet light irradiation) is used above to shorten the recovery time of the gas sensor, there is no limitation, and the ultraviolet light irradiation (preferably near-ultraviolet light irradiation) may also be used for recovering sensitivity of the gas sensor device 6 of which sensitivity is deteriorated due to contamination of the surface of the sensitive film 9.

Therefore, it is also possible to realize the long-life gas sensor 5 (gas sensor device 6).

Figure 10:
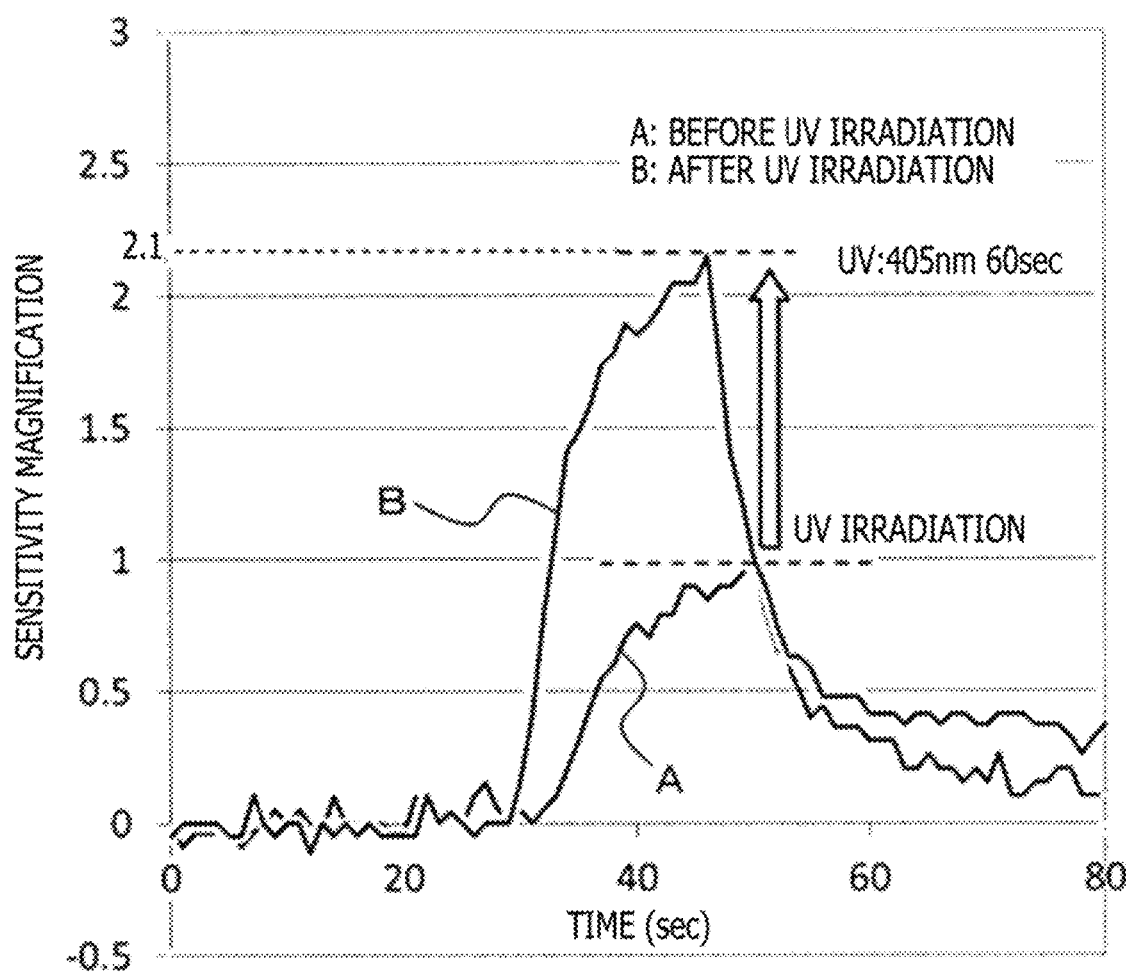
FIG. 10 is a diagram illustrating that a response characteristic is recovered by irradiating a sensitive film made of CuBr with ultraviolet rays in the gas sensor according to this embodiment.

Here, FIG. 10 is a diagram illustrating a result of confirming a response to ammonia gas by performing the ultraviolet light irradiation to the gas sensor device 6 manufactured more than about two years ago, the response to ammonia gas of which is deteriorated.

As illustrated in FIG. 10, it is understood that the response to ammonia gas after the ultraviolet light irradiation is about twice that before the ultraviolet light irradiation.

It is considered that organic substances and amine-based substances accumulated on the surface of the CuBr film 9 for a long time are decomposed and volatilized by the ultraviolet irradiation and the sensitivity recovers to some extent.

Figure 11:
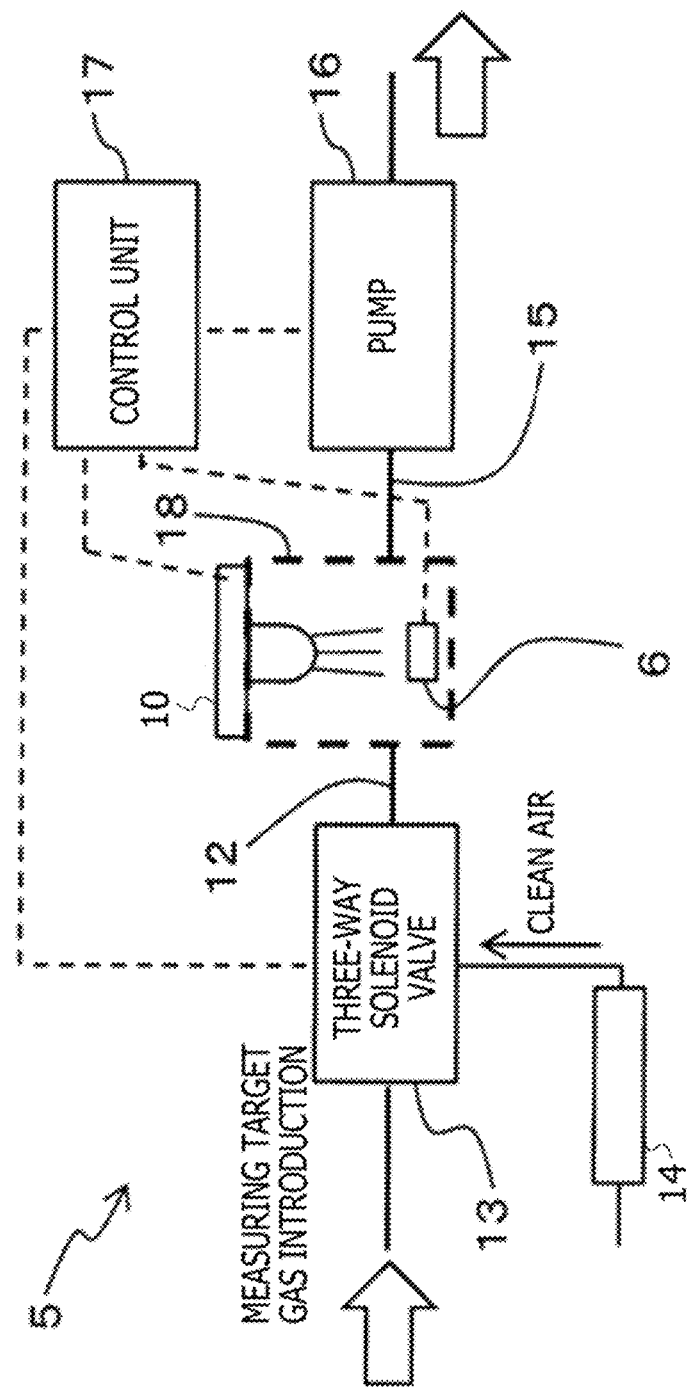
FIG. 11 is a diagram illustrating a configuration of the gas sensor according to this embodiment.

Here, FIG. 11 illustrates an example of the gas sensor 5 using the UV-LED 10 as the near-ultraviolet light source.

Note that, the gas sensor 5 is also referred to as a gas sensor system or a measuring device. Furthermore, in FIG. 11, a solid line indicates a gas piping path and a broken line indicates an electric signal path.

As illustrated in FIG. 11, the gas sensor 5 is provided with the gas sensor device 6 configured in the above-described manner, the UV-LED (light source) 10, gas supply side piping 12, a solenoid valve 13 provided on the gas supply side piping 12, a filter 14 provided on the gas supply side piping 12, exhaust side piping 15, a pump 16 provided on the exhaust side piping 15, and a control unit 17.

Here, the gas sensor device 6 is provided in a sensor chamber 18.

The gas sensor 5 has a structure in which the pump 16 draws outside air in the vicinity of the gas sensor device 6.

Furthermore, as for a path from an inlet (introducing port), there are a path through the filter 14 such as activated carbon and a path without the intervention of such filter 14, for example, and a structure is such that they are switched by the solenoid valve (here, three-way solenoid valve) 13.

Note that, although the solenoid valve 13 is used here, a valve for switching the paths is not limited to an electric valve, and may also be a manual valve as long as this may switch a gas flow path.

Furthermore, a UV-LED (UV-LED unit) is installed as the ultraviolet light source (near-ultraviolet light source) 10 directly above the gas sensor device 6.

Note that, the light source 10 may be any light source including a wavelength at which the sensitive film 9 (here, CuBr film) of the gas sensor device 6 becomes photocatalytically active, and is not limited to the UV-LED. For example, in a case where the sensitive film 9 is the CuBr film, this may be any light source capable of applying light including light having a wavelength of about 410 nm or shorter.

Furthermore, all of the pump 16, the solenoid valve 13, and the UV-LED 10 are connected to the control unit 17, and are controlled by the control unit 17 according to a programmed sequence.

Furthermore, the control unit 17 is configured to measure the concentration of the measuring target gas based on a value detected by the gas sensor device 6 in a case where the measuring target gas is supplied.

Therefore, it is also possible to realize a flexible gas sensor 5 by changing the sequence according to, for example, the measuring target, a measuring environment, and the purpose.

Figure 12:
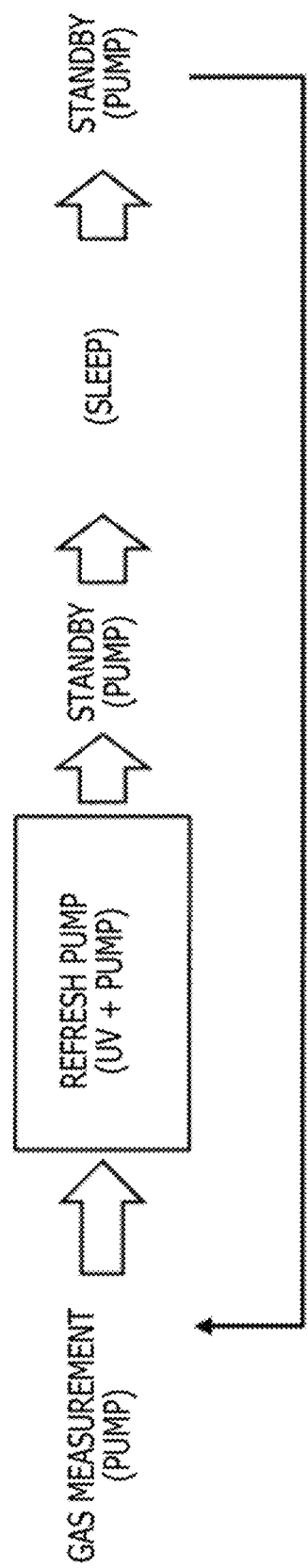
FIG. 12 is a diagram illustrating a gas concentration measurement sequence of the gas sensor according to this embodiment.

Here, FIG. 12 illustrates an example of a sequence (gas concentration measurement sequence) of the gas sensor capable of automatically and successively measuring the gas concentration.

As Illustrated in FIG. 12, the pump 16 is started to take in the measuring target gas to the gas sensor device 6 configured in the above-described manner.

First, in a gas measuring process, the pump 16 is operated and a change amount of the resistance (sensor resistance) of the gas sensor device 6 in a fixed time is detected, and the gas concentration corresponding to the change is calculated.

Figure 19:
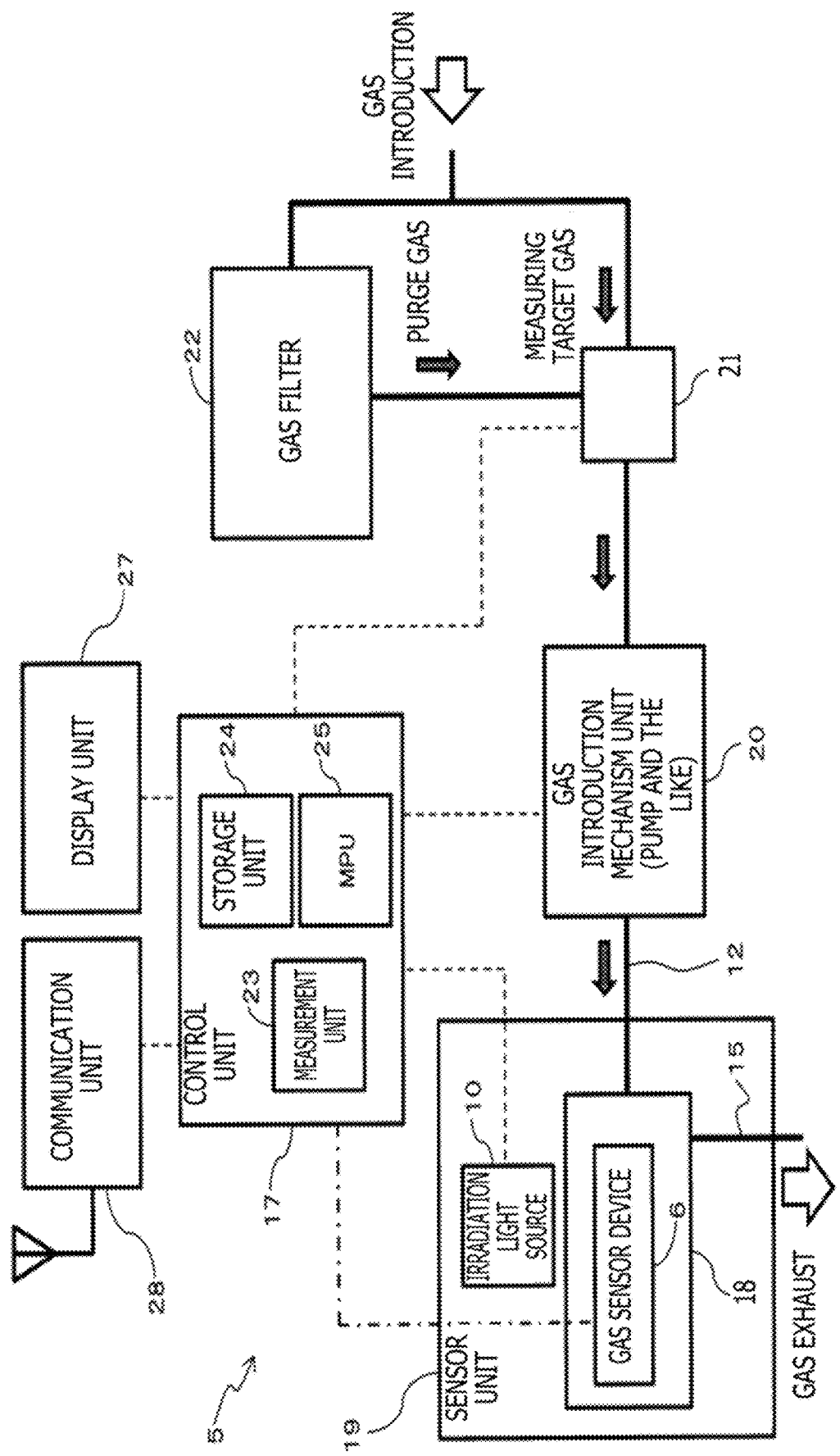
FIG. 19 is a diagram illustrating a configuration of the gas sensor according to this embodiment.

Note that, the gas concentration (data) calculated in this manner, a set value, and a detection value may be displayed on a display unit 27, or may be transmitted to a terminal, a server, and the like, for example, by a communication unit 28 (refer to, for example, FIG. 19).

Furthermore, correspondence data of the response of the gas sensor device 6 to the gas concentration is obtained in advance to be stored in a memory in the control unit 17.

Next, in a refresh (recovery) process, the path is switched to the filter 14 side by the solenoid valve 13 to take in dean air and the UV irradiation is simultaneously performed with the pump 16 kept operating.

Note that, although the dean air is herein taken in through the filter 14, there is no limitation, and the outside air may be taken in without the intervention of the filter 14.

This dean air introduction and UV irradiation are performed until the gas sensor device 6 recovers.

Figure 14:
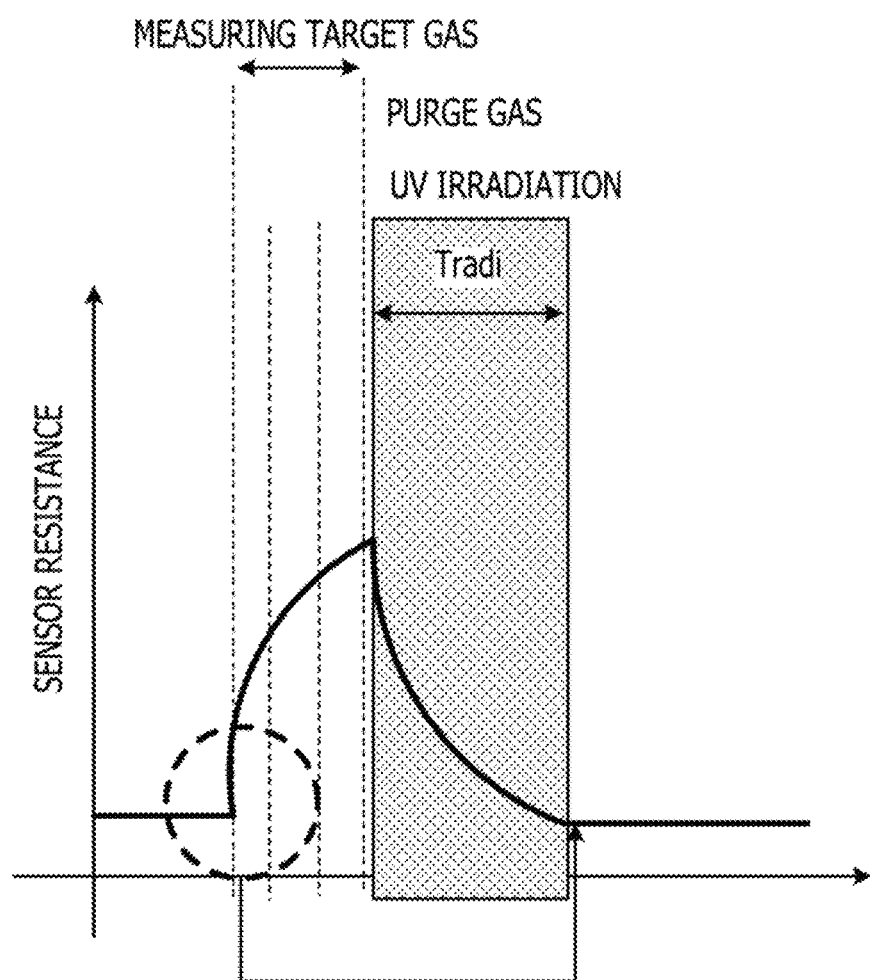
FIG. 14 is a diagram for illustrating control of gas concentration measurement and recovery in the gas sensor according to this embodiment.

Here, the time until the gas sensor device 6 recovers depends on magnitude of the response of the gas sensor device 6, so that this is not a fixed time and may be obtained as a time until the sensor resistance returns to that immediately before the gas concentration measurement by monitoring the sensor resistance also after the gas concentration is measured (refer to, for example, FIG. 14).

Then, when the sensor resistance returns to that immediately before the gas concentration measurement, the refresh process is stopped (UV irradiation is stopped), and it stands by with the pump 16 kept operating.

Subsequently, in a case where there is next measurement, the measurement is repeated again.

In a case where there is no measurement immediately, the pump 16 is stopped and it stands by (sleep).

Figure 13:
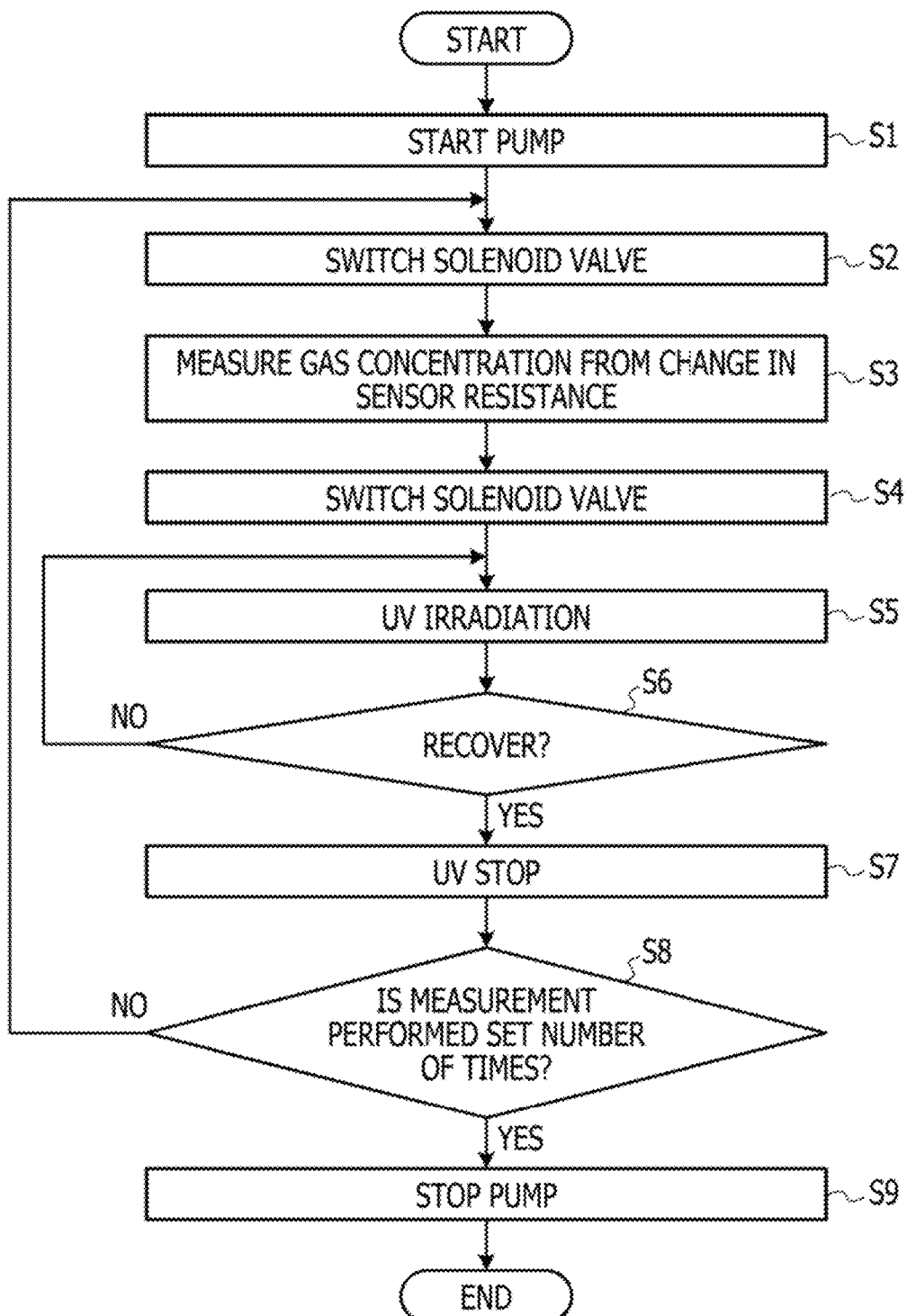
FIG. 13 is a flowchart for illustrating a process in the gas concentration measurement sequence of the gas sensor according to this embodiment.

Here, FIG. 13 is a flowchart illustrating a process (measuring method) in a case where such gas concentration measurement sequence is realized by execution of the program by the control unit 17 provided on the gas sensor 5.

As illustrated in FIG. 13, first, the control unit 17 controls the pump 16 to start the pump 16 (step S1).

Next, the control unit 17 controls the solenoid valve 13 so as to introduce the measuring target gas, and switches the path of the gas supply side piping 12 to a path without the intervention of the filter 14 (step S2).

Therefore, the measuring target gas is supplied into the sensor chamber 18 in which the gas sensor device 6 configured in the above-described manner is provided.

Next, the control unit 17 measures the concentration of the measuring target gas based on the value detected by the gas sensor device 6 (step S3).

Here, the control unit 17 detects the change amount of the resistance (sensor resistance) of the gas sensor device 6 in a predetermined time (fixed time; for example, 60 seconds), and calculates the gas concentration corresponding to the change, thereby measuring the concentration of the measuring target gas.

For example, the resistance value from the gas sensor device 6 at a time point immediately before the gas sensor device 6 is exposed to the measuring target gas is stored as an initial value, and the gas concentration may be calculated based on a change from the initial value of the resistance value from the gas sensor device 6 at a time point when the measuring target gas is introduced for a fixed time.

Specifically, when a measurement start time point immediately before the exposition to the measuring target gas is set to 0 seconds, a change rate of the resistance value $|R0-Rs|/R0-1$ when the sensor resistance value at that time is set to R0 and the sensor resistance value $t_{meas}$ seconds after that is set to Rs is calculated, and the gas concentration may be derived from this by a gas concentration conversion expression stored in the memory and the like in the control unit 17.

In this manner, the control unit 17 measures the concentration of the measuring target gas based on the resistance value from the gas sensor device 6 detected when the supply of the measuring target gas is started and the resistance value from the gas sensor device 6 detected when the measuring target gas is supplied for a predetermined time.

Next, the control unit 17 controls the solenoid valve 13 so as to introduce the dean air in place of the measuring target gas with the pump 16 kept operating, and switches the path of the gas supply side piping 12 to a path through the filter 14 (step S4).

Therefore, the dean air is supplied into the sensor chamber 18 in which the gas sensor device 6 is provided.

Note that, the dean air is also referred to as purge gas. Furthermore, a mechanism which supplies the purge gas in place of the measuring target gas in this manner is also referred to as a purge gas supply mechanism. Here, the purge gas supply mechanism is formed of the solenoid valve 13 and the filter 14.

Next, the control unit 17 controls the UV-LED (light source 10; ultraviolet light irradiation mechanism) in order to apply light having a wavelength required for expressing the photocatalytic function, and perform the UV irradiation to the sensitive film (here, CuBr film; refer to FIG. 7) 9 of the gas sensor device 6 (step S5).

In this manner, after measuring the concentration of the measuring target gas, during the recovery time for refreshing (recovering) the gas sensor device 6 by introducing the dean air to desorb the gas separation adsorbed to the surface of the sensitive film 9 of the gas sensor device 6, the UV irradiation is performed to the surface of the sensitive film 9 of the gas sensor device 6 (refer to, for example, FIG. 14).

That is, at the time of recovery of the sensor resistance immediately after the measurement of the concentration of the measuring target gas, the UV irradiation is performed to the surface of the sensitive film 9 of the gas sensor device 6.

In this case, the UV irradiation is performed to the surface of the sensitive film 9 of the gas sensor device 6 while the dean air is supplied to the gas sensor device 6.

Next, the control unit 17 determines whether the gas sensor device 6 recovers (step S6).

Here, the control unit 17 monitors the sensor resistance also after the gas concentration measurement, and determines whether the gas sensor device 6 recovers depending on whether the sensor resistance returns to that immediately before the gas concentration measurement (the initial value stored at the beginning) (refer to, for example, FIG. 14).

As a result of this determination, in a case where it is determined that the gas sensor device 6 does not recover, the procedure shifts to a NO route and returns to step S5 to continue the UV irradiation.

Therefore, the UV irradiation is started at the same time as switching from the measuring target gas to the purge gas, and the UV irradiation is continued until the sensor resistance recovers to the sensor resistance equal to or lower than that immediately before introducing the measuring target gas (refer to, for example, FIG. 14).

Then, in a case of determining that the gas sensor device 6 recovers, the control unit 17 shifts to a YES route and stops the UV Irradiation (step S7).

Here, since the UV irradiation is performed together with the introduction of the purge gas, a recovery time ($t_{radi}$) is shortened as compared with a case where the UV irradiation is not performed. The recovery time becomes about one-seventh, for example, from about 290 seconds to about 40 seconds (refer to, for example, FIG. 8).

Therefore, the refresh process ends. However, since the pump 16 is not stopped at this point of time, it is put into a standby state in which the clean air is kept flowing. At that time, the sensor resistance returns to its initial value and is stable.

Next, the control unit 17 determines whether it is measured the set number of times (step S8).

As a result of this determination, in a case where it is determined that it is not measured the set number of times, the procedure shifts to a NO route and returns to step S2 to continue the measurement.

Then, in a case of determining that it is measured the set number of times, the control unit 17 shifts to a YES route, and the control unit 17 controls the pump 16 to stop the pump 16 (step S9), and the procedure ends.

Note that, although a case where it stands by with the pump 16 kept operating after the measurement of one time ends and the next measurement is performed is herein described as an example, in a case where a time until the next measurement starts is long and the like, it is also possible to include a sleep in which it stands by with the pump 16 stopped.

Furthermore, for example, it is also possible to stop the pump 16 when a time sufficiently longer than the UV irradiation time (for example, a time about three times longer than the UV irradiation time) elapses.

By the way, in a case where the process described above is performed, the control unit 17 measures the concentration of the measuring target gas based on the value detected by the gas sensor device 6 in a case where the measuring target gas is supplied, and also controls the light source.

Furthermore, the control unit 17 controls a gas supply timing and a gas supply time for supplying the measuring target gas, and also controls a light irradiation timing and a light irradiation time for irradiating the sensitive film 9 with light from the light source 10.

Furthermore, the control unit 17 controls the light source 10 to irradiate the sensitive film 9 with light at a timing at which the supply of the measuring target gas is stopped.

Furthermore, the control unit 17 controls the light source 10 to irradiate the sensitive film 9 with light until the resistance value returns to that from the gas sensor device 6 detected when the supply of the measuring target gas is started.

Furthermore, the control unit 17 controls a purge gas supply timing and a purge gas supply time for supplying the purge gas.

Furthermore, as a measuring method, the control unit 17 performs control to supply the measuring target gas to the gas sensor device 6 configured in the above-described manner, in other words, the gas sensor device 6 provided with the sensitive film 9 made of cuprous bromide in which cuprous bromide expresses the photocatalytic property of decomposing a substance brought into contact with cuprous bromide by the light irradiation. Furthermore, the control unit 17 measures the concentration of the measuring target gas based on the value detected by the gas sensor device 6. Furthermore, the control unit 17 controls to stop supplying the measuring target gas and controls the light source 10 to irradiate the sensitive film 9 with light.

Furthermore, the control unit 17 controls the light source 10 to irradiate the sensitive film 9 with light until the resistance value returns to that from the gas sensor device 6 detected when the supply of the measuring target gas is started.

Figure 15:
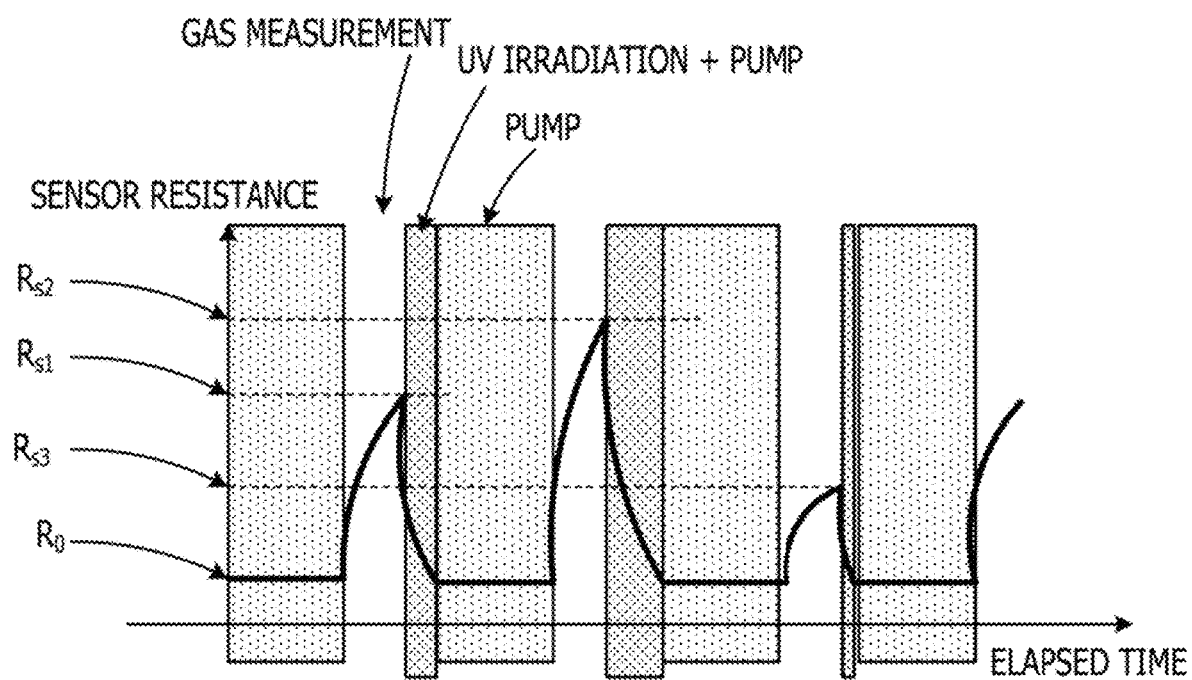
FIG. 15 is a diagram for illustrating an example of a temporal change in sensor resistance in a case where the gas concentration is measured along the gas concentration measurement sequence in the gas sensor according to this embodiment.

Here, FIG. 15 illustrates an example of a temporal change in sensor resistance in a case where the gas concentration is measured in the above-described manner.

Conventionally, it took a relatively long time to recover, so that it was difficult to measure the concentration successively; however, by performing the UV irradiation, the recovery time is shortened and the gas concentration may be measured at short time intervals.

In this manner, by providing the ultraviolet light irradiation mechanism (ultraviolet light irradiation optical system; light source 10) as a refresh mechanism for refreshing (recovering) the gas sensor device 6 by irradiating the gas sensor device 6 with light on the gas sensor 5 configured in the above-described manner, the recovery time (refresh time) may be shortened and the gas concentration may be measured at short time intervals.

By the way, the above-described configuration is made for a following reason.

In a case of measuring the concentration of gas included in surrounding air by using the gas sensor, it is necessary to consider based on the sensor response when the target gas is not included.

That is, when the sensor resistance when the target gas is not included is set to baseline resistance R0 and the sensor resistance when responding to the target gas is set to Rs, magnitude of the sensor response to the gas is expressed by Rs/R0, and the concentration is allowed to correspond to the magnitude of the response to obtain the concentration of the target gas.

In this manner, determining the baseline is most important in the gas concentration measurement.

In order to repeatedly measure the concentration of the target gas, it is only required to repeatedly obtain the baseline and the sensor response to the gas, but in order to obtain the baseline, it is required to replace the air around the sensor with gas not including the target gas and return the elevated sensor resistance to the value before the gas exposure. To this end, it is necessary to supply dean air around the sensor with a pump and the like to desorb gas molecules remaining on the surface.

However, with this method, it takes about 10 minutes for the sensor resistance to recover to the baseline to be ready for the next measurement, and most of the time required for one measurement was this recovery time.

Therefore, by using the CuBr film having the photocatalytic property as described above as the sensitive film 9 of the gas sensor device (ammonia gas sensor device) 6, installing a mechanism capable of irradiating the film surface with light having a wavelength expressing the photocatalytic property (here, the light source 10), and applying light when the gas sensor device 6 recovers, the gas sensor 5 which recovers quickly and may repeatedly measure the concentration is realized.

Therefore, the photocatalyst, the gas sensor device, the gas sensor, and the measuring method according to this embodiment have an effect of shortening the time required for decomposing the decomposition target, in other words, the time required for desorbing the gas molecules of the target gas, thereby shortening the measuring time.

Note that, the configuration of the gas sensor 5 is not limited to that of the above-described embodiment (refer to, for example, FIG. 11), and may have another configuration.

Figure 16:
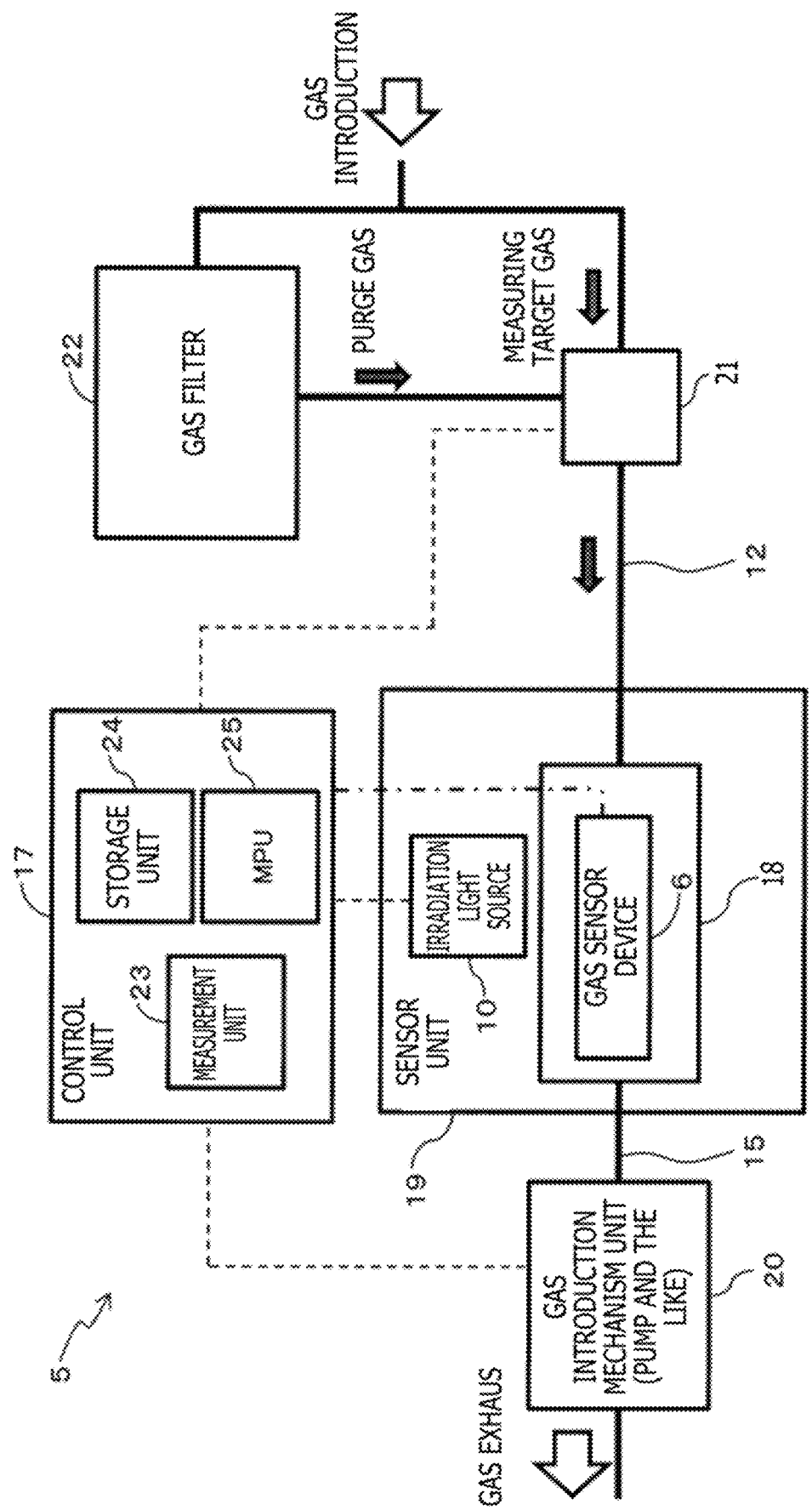
FIG. 16 is a diagram illustrating a configuration of the gas sensor according to this embodiment.

For example, as illustrated in FIG. 16, the gas sensor 5 (gas sensor system) may be formed to include a sensor unit 19, the control unit 17, a gas introduction mechanism unit 20, a gas flow path switching device 21, and a gas filter (gas filter mechanism unit) 22. This is referred to as a first variation.

Note that, in FIG. 16, a solid line indicates a gas flow path, a broken line indicates a control signal, and a dashed-dotted line indicates a sensor signal.

In this case, the sensor unit 19 may be provided with the gas sensor device 6 configured in the above-described manner, the gas sensor chamber 18 provided with the gas sensor device 6 therein, and the light source (irradiation light source) 10 which irradiates the sensitive film 9 (refer to, for example, FIG. 7) of the gas sensor device 6 with light.

Furthermore, the control unit 17 may be provided with a measurement unit 23 which measures the resistance (sensor resistance) from the gas sensor device 6, a storage unit 24 such as a memory, for example, and a microprocessor unit (MPU) 25.

Here, the light source 10 is, for example, a UV-LED and the like.

Furthermore, the gas introduction mechanism unit 20 is, for example, the pump 16 and the like.

Furthermore, the gas flow path switching device 21 is, for example, the solenoid valve 13 such as a three-way solenoid valve.

Figure 17:
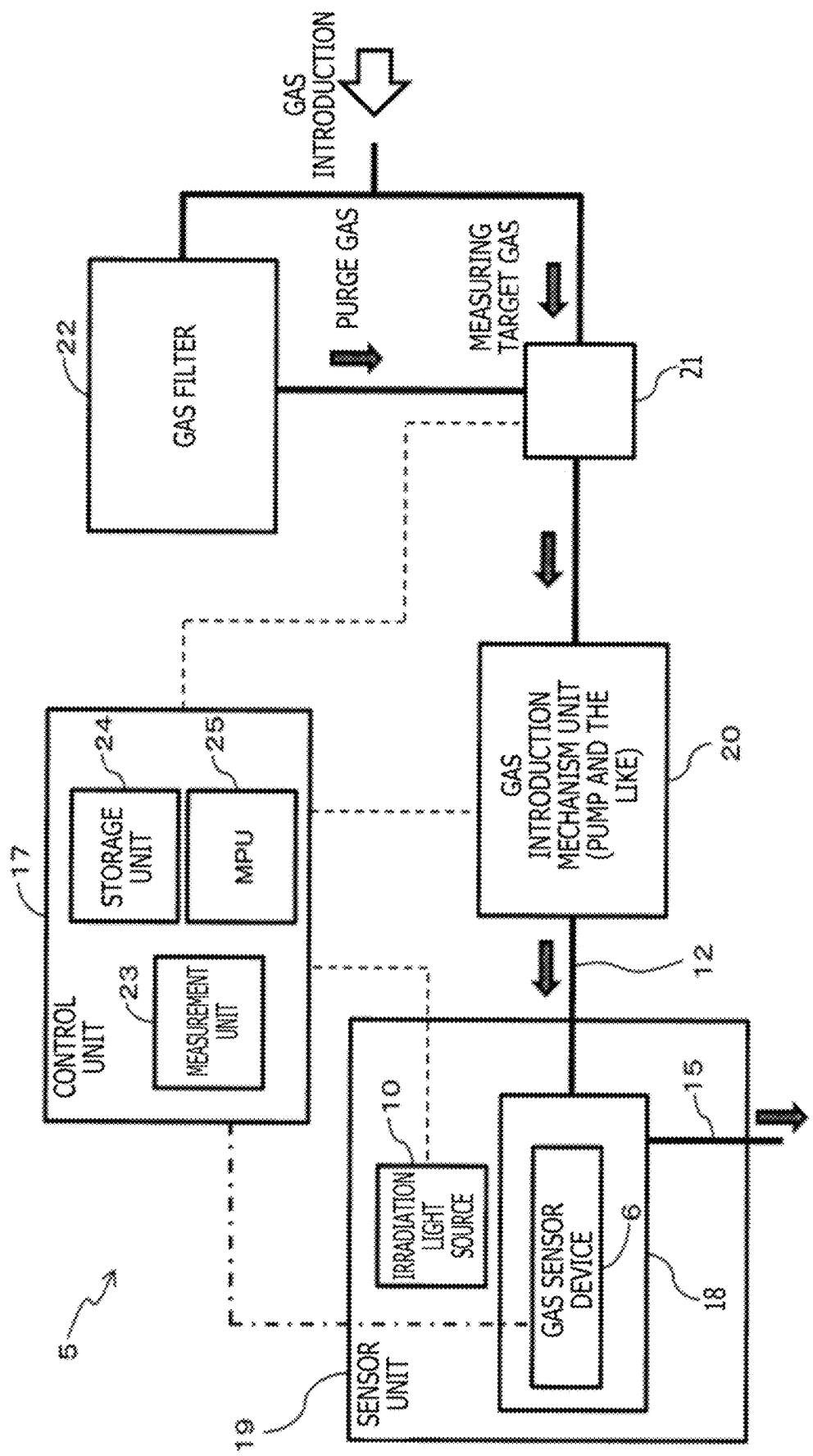
FIG. 17 is a diagram illustrating a configuration of the gas sensor according to this embodiment.

Furthermore, for example, as illustrated in FIG. 17, the gas sensor 5 (gas sensor system) may be such that the gas introduction mechanism unit 20 is provided on the gas supply side piping 12 in the configuration of the first variation described above. This is referred to as a second variation.

That is, it is also possible to provide the gas introduction mechanism unit 20 such as the pump 16, for example, on the gas supply side piping 12 instead of providing the pump 16 on the exhaust side piping 15 in the above-described embodiment (refer to, for example, FIG. 11) and the above-described first variation (refer to, for example, FIG. 16).

Note that, in FIG. 17, a solid line indicates a gas flow path, a broken line indicates a control signal, and a dashed-dotted line indicates a sensor signal.

Figure 18:
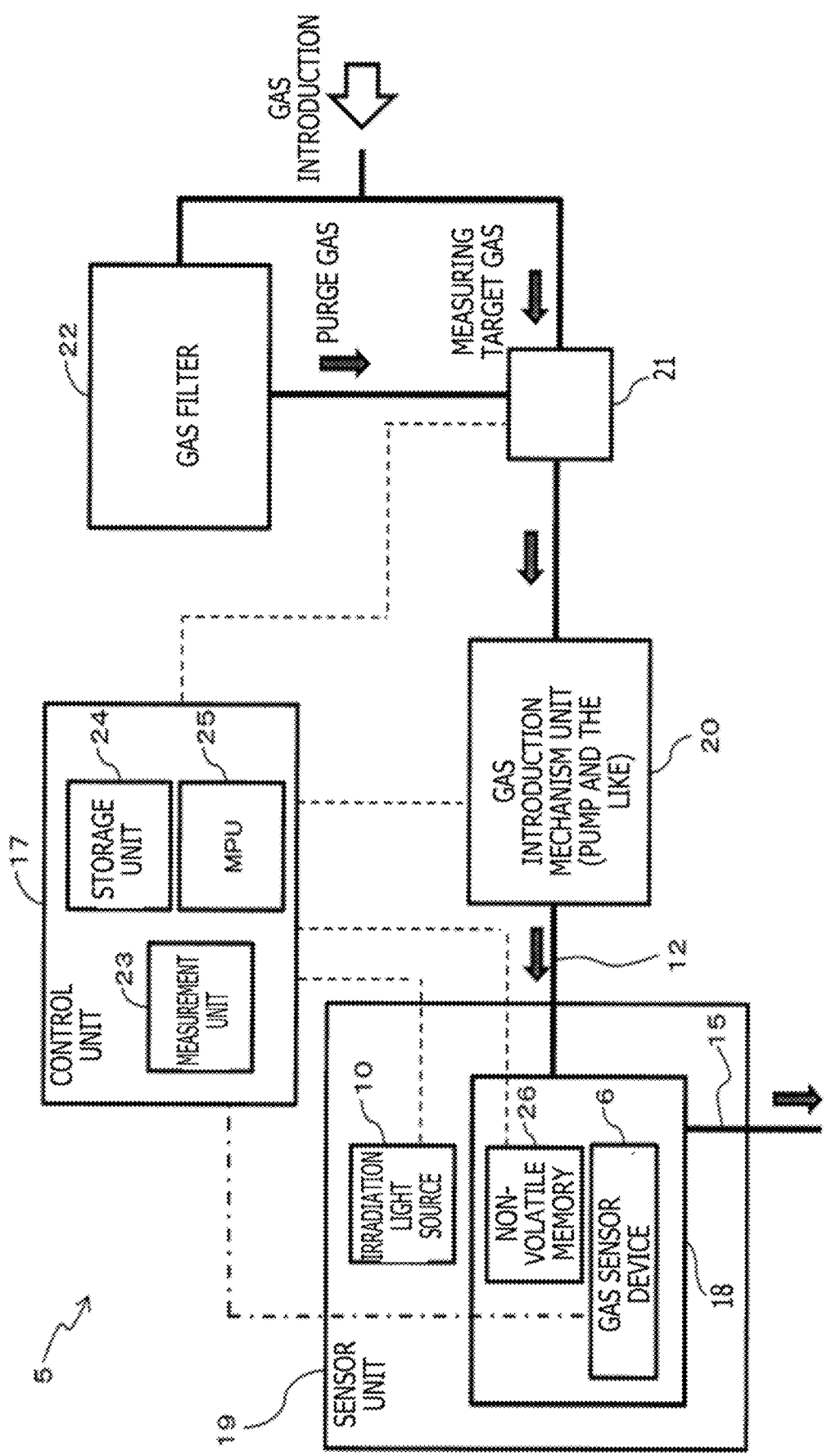
FIG. 18 is a diagram illustrating a configuration of the gas sensor according to this embodiment.

Furthermore, for example, as illustrated in FIG. 18, the gas sensor 5 (gas sensor system) may be such that a non-volatile memory (non-volatile memory element) 26 is further provided in the gas sensor chamber 18 in the configuration of the second variation described above (for example, refer to FIG. 17). This is referred to as a third variation.

Note that, in FIG. 18, a solid line indicates a gas flow path, a broken line indicates a control signal, and a dashed-dotted line indicates a sensor signal.

For example, it is also possible to mount the non-volatile memory element 26 in which characteristics of the gas sensor device 6 are recorded on the substrate forming the gas sensor device 6 provided in the gas sensor chamber 18, and connect the same to the control unit 17.

In this case, for example, it is also possible to store information such as basic characteristics of the gas sensor device 6, a conversion expression for converting the magnitude of the response of the gas sensor device 6 into the gas concentration, and the gas concentration measurement sequence, for example, in the non-volatile memory element 26, and read out them to reset the setting in the control unit 17 each time the gas sensor device 6 is replaced.

Furthermore, for example, it is also possible to record the number of times of use of the gas sensor 5, for example, in the non-volatile memory element 26 and use the same for determining a time for replacement and the like. For example, by providing notification of the time for replacement according to the number of times of use of the gas sensor 5, convenience may be improved.

Furthermore, for example, as illustrated in FIG. 19, the gas sensor 5 (gas sensor system) may be further provided with a display unit 27 and a communication unit (transfer unit) 28 in the configuration of the second variation described above (refer to, for example, FIG. 17). This is referred to as a fourth variation.

Note that, in FIG. 19, a solid line indicates a gas flow path, a broken line indicates a control signal, and a dashed-dotted line indicates a sensor signal.

In this case, the display unit 27 may be allowed to display the gas concentration (data) calculated by the control unit 17, the set value, the detection value, and the like. Furthermore, the communication unit 28 may transmit the data such as the gas concentration, set value, and detection value, for example, to another terminal, server, and the like, for example.

By the way, in the gas sensor 5 of the above-described embodiment and each variation, the gas concentration measurement sequence for successively performing automatic measurement may be set.

For example, in a case where it is configured as in the above-described embodiment and each variation, it is possible to perform measuring target gas introduction control, purge gas introduction control, and light irradiation control (UV irradiation control) based on the gas concentration measurement sequence stored in the storage unit 24 provided on the control unit 17, and measure the gas concentration based on the response (sensor response) of the gas sensor device 6 provided on the sensor unit 19.

In this case, the gas concentration measurement sequence may be divided into a start sequence, a measurement sequence, and a stop sequence, and may be formed of sequences in which timings of the measuring target gas introduction control, purge gas introduction control, and light irradiation control (UV irradiation control) within each sequence are separately set in advance.

Figure 20:
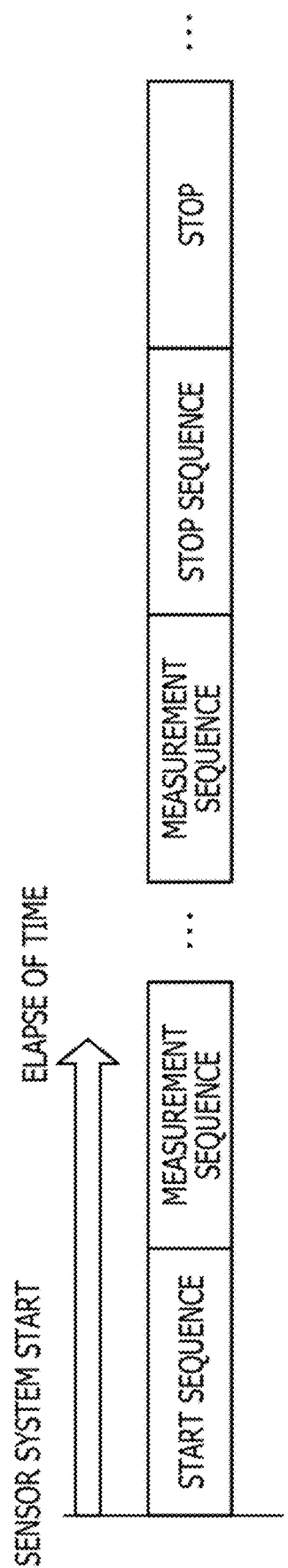
FIG. 20 is a diagram for illustrating the gas concentration measurement sequence of the gas sensor according to this embodiment.

For example, as illustrated in FIG. 20, from the start of the gas sensor system 5, the start sequence, the measurement sequence, the measurement sequence, . . . , and the stop sequence may be executed with time and stopped.

Note that, the measurement sequence may be configured by being selected from a plurality of measurement patterns included in groups A to G to be described later.

Figure 21:
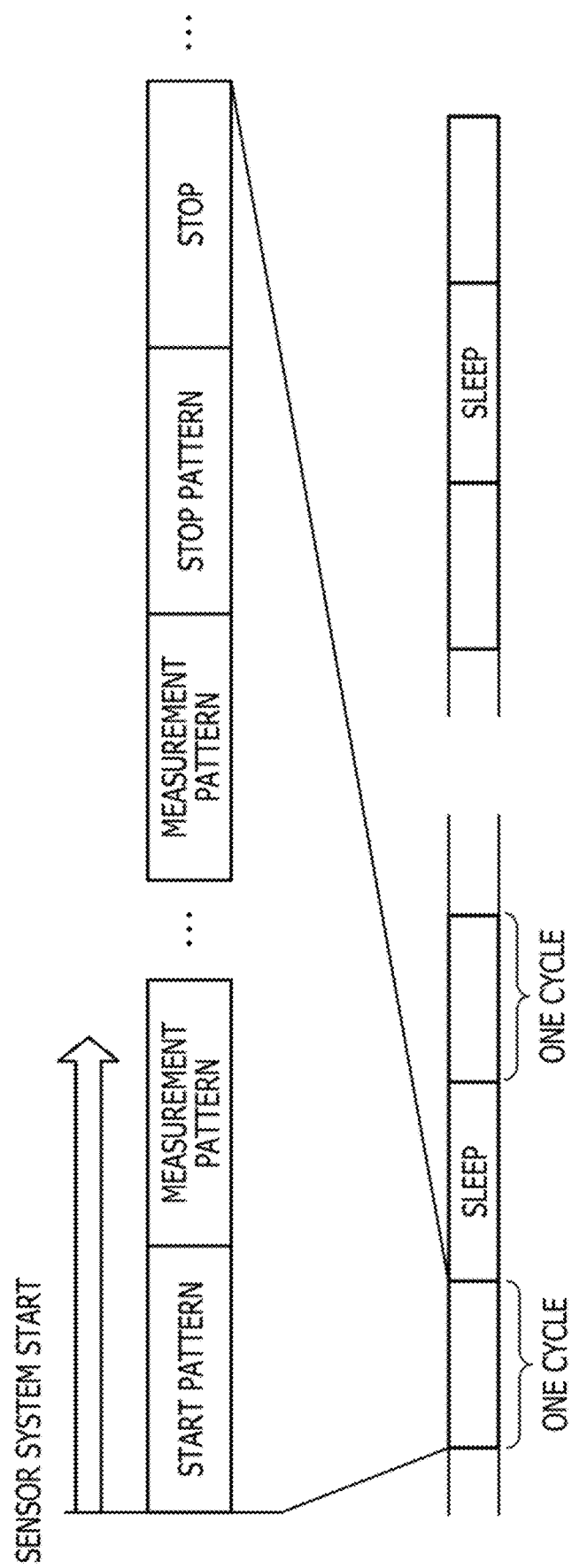
FIG. 21 is a diagram for illustrating a case where measurement is performed by intermittent operation in the gas concentration measurement sequence of the gas sensor according to this embodiment.

Furthermore, for example, in a case where a measurement interval is long, it is possible to make the above-described series of sequences one cycle and set a sleep between the respective cycles to measure by intermittent operation as illustrated in FIG. 21.

Note that, the start sequence, the measurement sequence, and the stop sequence may be set or selected depending on the measuring target and the type of measurement.

Here, the start sequence is a sequence for performing a test run operation, in other words, operation confirmation of the gas sensor 5 (operation confirmation of the gas sensor device 6 and the UV light source 10) with the sensor chamber 18 kept sealed before the measurement is started.

Parameters set in advance of this start sequence include full time, UV irradiation timing and time, pump operation timing and time, solenoid valve switching timing and time, and the like.

Figure 22:
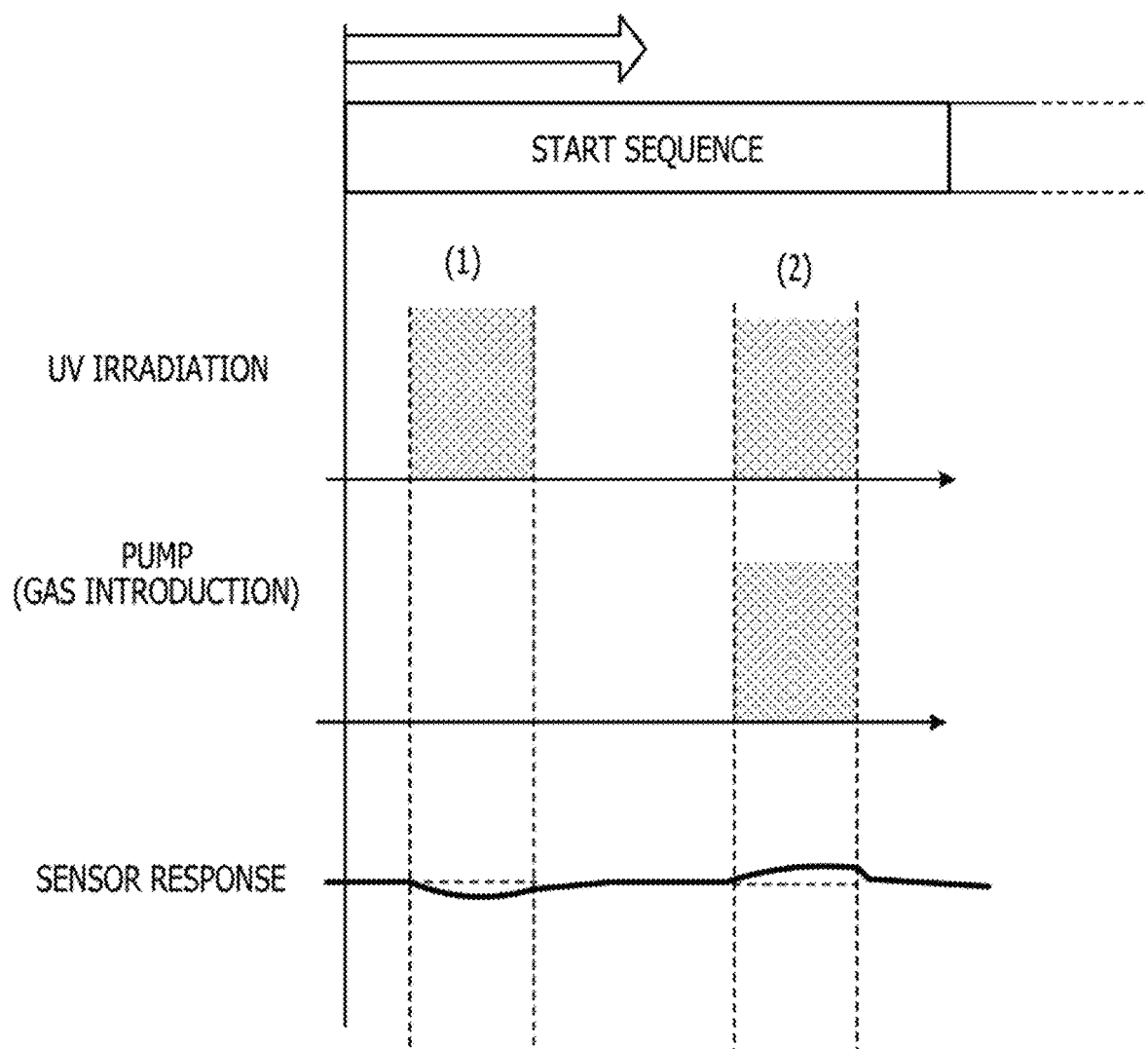
FIG. 22 is a diagram for illustrating a start sequence included in the gas concentration measurement sequence of the gas sensor according to this embodiment.

In the start sequence, as illustrated in FIG. 22, first, only the UV irradiation is performed to confirm the sensor response (first operation confirmation; (1) in FIG. 22).

For example, it is possible to confirm a degree of change of the resistance value from the gas sensor device 6 after the UV irradiation is performed for a fixed time.

By performing this confirmation, it is also possible to desorb dirt and the like attached to the surface of the sensitive film 9 (refer to, for example, FIG. 7) of the gas sensor device 6.

Next, the measuring target gas is introduced at the same time as the UV irradiation to confirm the sensor response (second operation confirmation; (2) in FIG. 22).

For example, it is possible to confirm a degree of change of the resistance value from the gas sensor device 6 after operating the pump 16 (20) for a fixed time with the UV irradiation and in a state in which the solenoid valve 13 (21) is switched to the path without the intervention of the filter 14 (22).

In this case, although the measuring target gas is introduced, the UV irradiation is also performed at the same time, so that the gas molecules of the measuring target gas do not remain on the surface of the sensitive film 9 of the gas sensor device 6 and the sensor response is small, but it is sufficient when the sensor response is confirmed.

Therefore, the sensor response may be confirmed without contaminating the surface of the sensitive film 9 of the gas sensor device 6.

Note that, here, although the first operation confirmation and the second operation confirmation are performed in this order, there is no limitation, and it is also possible to perform only one of the operation confirmations, or the order may be reversed.

Furthermore, it is also possible to omit the start sequence and start from the measurement sequence to be described later.

Figure 23:
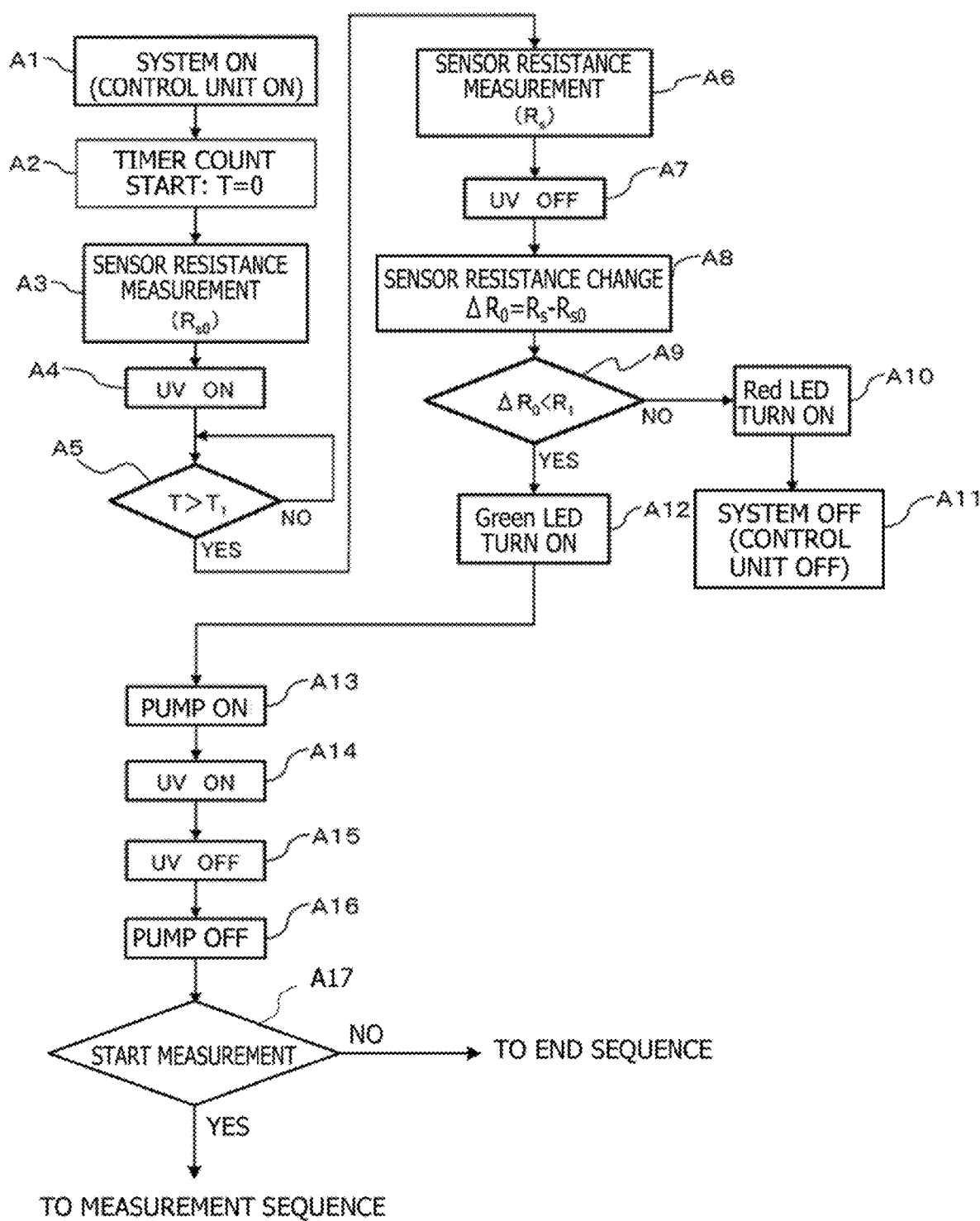
FIG. 23 is a flowchart for illustrating a process in the start sequence included in the gas concentration measurement sequence of the gas sensor according to this embodiment.

Here, FIG. 23 is a flowchart illustrating a process in a case where such start sequence is realized by execution of the program by the control unit 17 provided on the gas sensor 5.

First, when the gas sensor (gas sensor system) 5 is turned on, the control unit 17 is turned on (step A1) and a timer is started (step A2). Note that, a timer count starts at T=0.

At this point of time, the control unit 17 measures the sensor resistance, in other words, a resistance value $R_{S0}$ from the gas sensor device 6 (step A3).

Next, the control unit 17 turns on the light source (here, UV-LED) 10 and irradiates the sensitive film 9 of the gas sensor device 6 with light (here, UV) (step A4).

In a state in which the UV irradiation is performed in this manner, the control unit 17 determines whether a count T of the timer is greater than $T_1$ (step A5), and in a case where this does not determine that T is greater than $T_1$, this shifts to a NO route to repeat this determination. Here, $T_1$ is a UV irradiation time, in other words, a fixed time for performing the UV irradiation, and is set in advance.

Thereafter, in a case where it is determined that T is greater than $T_1$, the procedure shifts to a YES route, and the sensor resistance, in other words, a resistance value $R_S$ from the gas sensor device 6 is measured (step A6).

Then, the control unit 17 turns off the light source (here, UV-LED) 10 and ends the irradiation with light to the sensitive film 9 of the gas sensor device 6 (here, UV irradiation) (step A7).

Next, the control unit 17 calculates a change in sensor resistance measured in the above-described manner, in other words, $\Delta R_0 = R_S - R_{S0}$ (step A8).

Next, the control unit 17 determines whether the change in sensor resistance calculated in this manner, in other words, $\Delta R_0$ is smaller than $R_1$ (step A9). Here, is a sensor operation confirmation resistance value, which is set in advance.

As a result of this determination, in a case where it is not determined that $\Delta R_0$ is smaller than $R_1$, the procedure shifts to a NO route, the control unit 17 turns on a red RED (step A10) and turns off, and the gas sensor (gas sensor system) 5 is turned off (step A11).

In this manner, the control unit 17 confirms a degree of change of the resistance value from the gas sensor device 6 after the UV irradiation is performed for a fixed time, in other words, confirms the sensor response in a case where the UV irradiation is performed for a fixed time, and in a case where the sensor response is not excellent, this turns on the red RED as a warning and turns off the power.

In contrast, in a case where it is determined that $\Delta R_0$ is smaller than $R_1$, the procedure shifts to a YES route, the control unit 17 turns on a green RED (step A12), turns on the pump 16 (step A13), and turns on the light source (here, UV-LED) 10 (step A14).

Therefore, the pump 16 (20) operates in a state in which the solenoid valve 13 (21) is switched to the path without the intervention of the filter 14 (22) and the measuring target gas is introduced, and the sensitive film 9 of the gas sensor device 6 is irradiated with light (here, UV), and they are performed for a fixed time.

Thereafter, it is counted and the like with the timer as in the above description, and when a fixed time elapses, the control unit 17 turns off the light source (here, UV-LED) 10 (step A15) and turns off the pump 16 (step A16).

In this case, as in the above description, the control unit 17 measures the sensor resistance before and after the UV irradiation and the introduction of the measuring target gas, calculates the change thereof, determines whether this is larger than a predetermined value and the like, thereby confirming a degree of change of the resistance value from the gas sensor device 6 after the UV irradiation and the introduction of the measuring target gas are performed for a fixed time, in other words, the sensor response in a case where the measuring target gas is introduced simultaneously with the UV irradiation. Then, in a case where the sensor response is not excellent, it is possible to turn on the red RED as an alarm and turn off the power as in the above description.

Then, in a case where the sensor response is excellent, the procedure shifts to step A17 and the control unit 17 determines whether to start the measurement, and in a case where this determines to start the measurement, the procedure shifts to a YES route and the measurement sequence to be described later is executed. In contrast, in a case where it is not determined to start the measurement, the procedure shifts to a NO route and shifts to an end sequence.

In a case of performing the control as described above, the control unit 17 provided on the gas sensor 5 controls the light source 10 to irradiate the sensitive film 9 of the gas sensor device 6 with light, controls the light source 10 to irradiate the sensitive film 9 with light while supplying the measuring target gas, or controls the light source 10 to irradiate the sensitive film 9 with light and controls to the light source 10 to irradiate the sensitive film 9 with light while supplying the measuring target gas at the time of starting before the measurement is started.

Next, the measurement sequence is a sequence for measuring the gas concentration.

Figure 24:
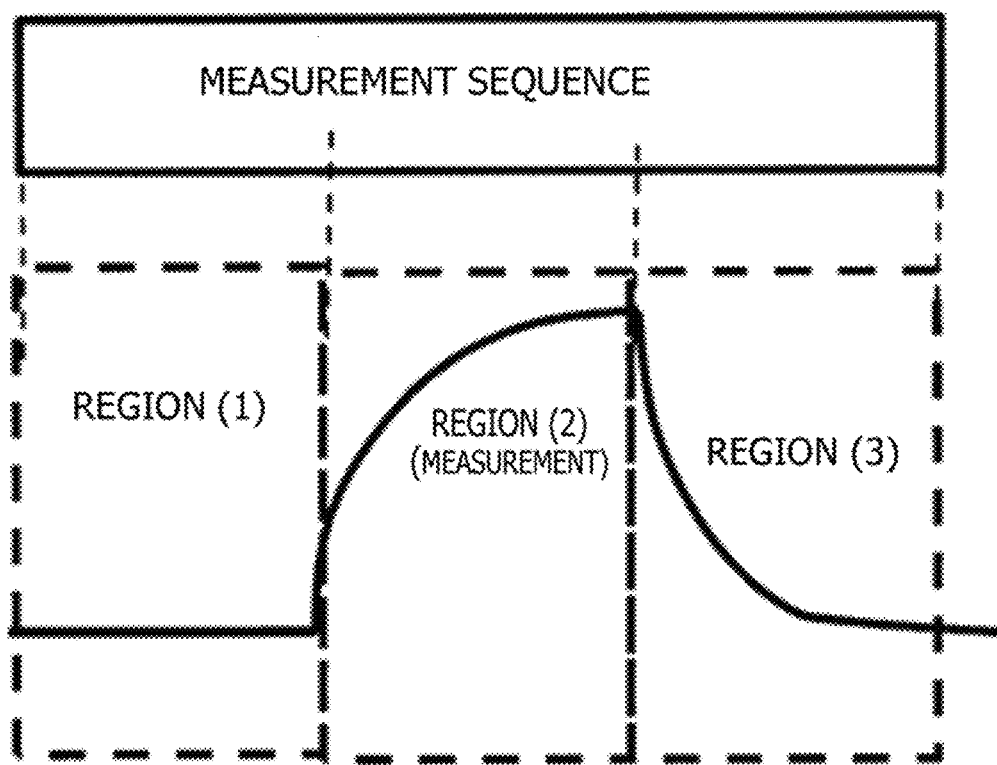
FIG. 24 is a diagram for illustrating a measurement sequence included in the gas concentration measurement sequence of the gas sensor according to this embodiment.

Here, as illustrated in FIG. 24, one measurement sequence is divided into three regions [region (1), region (2), and region (3)], and the gas concentration is measured from the sensor response in the region (2); as for the timings of the measuring target gas introduction control, purge gas introduction control, and light irradiation control (UV irradiation control), a pattern is specified out of a plurality of measurement patterns (here, a plurality of measurement patterns included in groups A to G to be described later) stored in the storage unit 24 provided on the control unit 17 in advance, so that the measurement sequence may be easily executed.

Figures 25A, 25B:
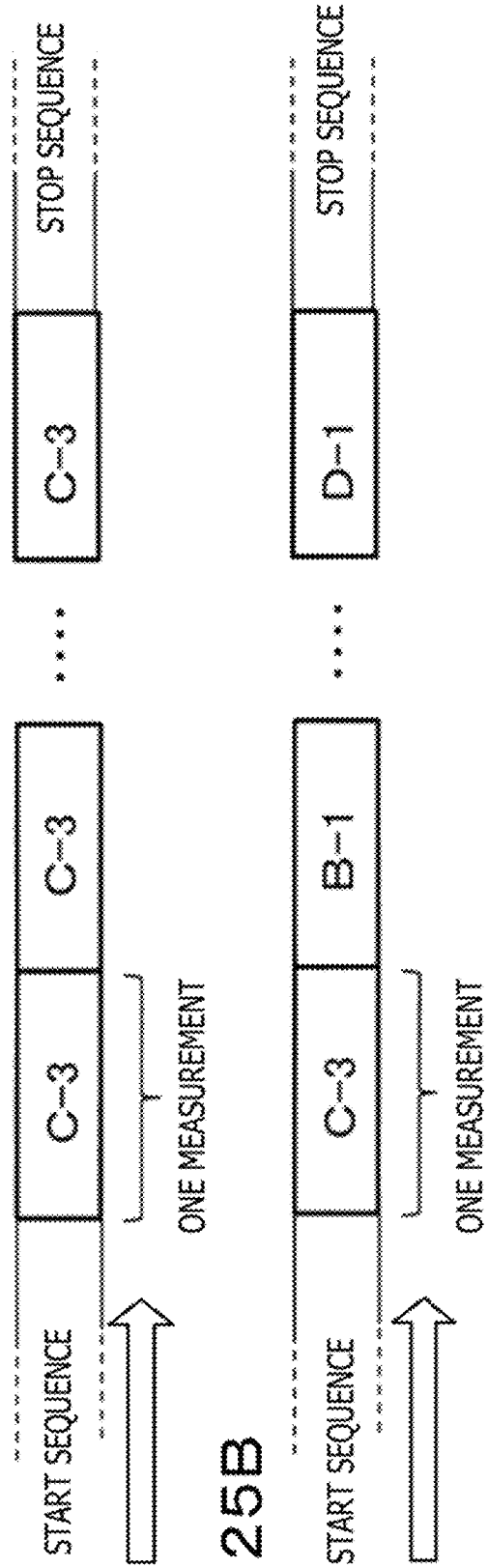
FIGS. 25A and 25B are diagrams illustrating an example of a combination of patterns in the measurement sequence included in the gas concentration measurement sequence of the gas sensor according to this embodiment.

For example, as illustrated in FIG. 25A, in a case where the start sequence, a plurality of measurement sequences, and the stop sequence are executed in sequence, all of the plurality of measurement sequences may be executed by specifying a pattern C-3 out of a plurality of measurement patterns included in the groups A to G to be described later as the measurement pattern.

Furthermore, for example, as illustrated in FIG. 25B, in a case where the start sequence, a plurality of measurement sequences, and the stop sequence are executed in sequence, the plurality of measurement sequences may be executed by specifying patterns C-3, B-1, D-1, and the like out of a plurality of measurement patterns included in the groups A to G to be described later as the measurement pattern.

In this case, the control unit 17 provided on the gas sensor 5 executes the measurement sequence for measuring the concentration of the measuring target gas while dividing the same into the first region, the second region, and the third region, executes the specified pattern out of a plurality of patterns obtained by combining the measuring target gas supply control, purge gas supply control, and light irradiation control in the first, second, and third regions, and measures the concentration of the measuring target gas based on a value detected by the gas sensor device 6 in the second region.

The parameters set in advance of this measurement sequence include the measurement pattern (here, a plurality of measurement patterns included in the groups A to G to be described later), a time of each of the region (1), region (2), and region (3) of the measurement sequence, a UV irradiation time (ratio to time of entire region), and the like.

Here, the measurement pattern is a pattern in which the UV irradiation timing and the gas introduction timing of the measuring target gas and the purge gas are defined. That is, the measurement pattern is a pattern in which the pump operation timing and time, the solenoid valve switching timing and time, and the UV irradiation timing and time are defined. Note that, the measurement pattern is also referred to as a sequence pattern group.

Here, as the UV irradiation timing, as illustrated in FIG. 26, the region in which the UV irradiation is performed is defined out of the three regions of the measurement sequence of the region (1), the region (2), and the region (3) in each of the groups A to G. Note that, in FIG. 26, a circle is put in a case where the UV irradiation is performed.

Figure 27:
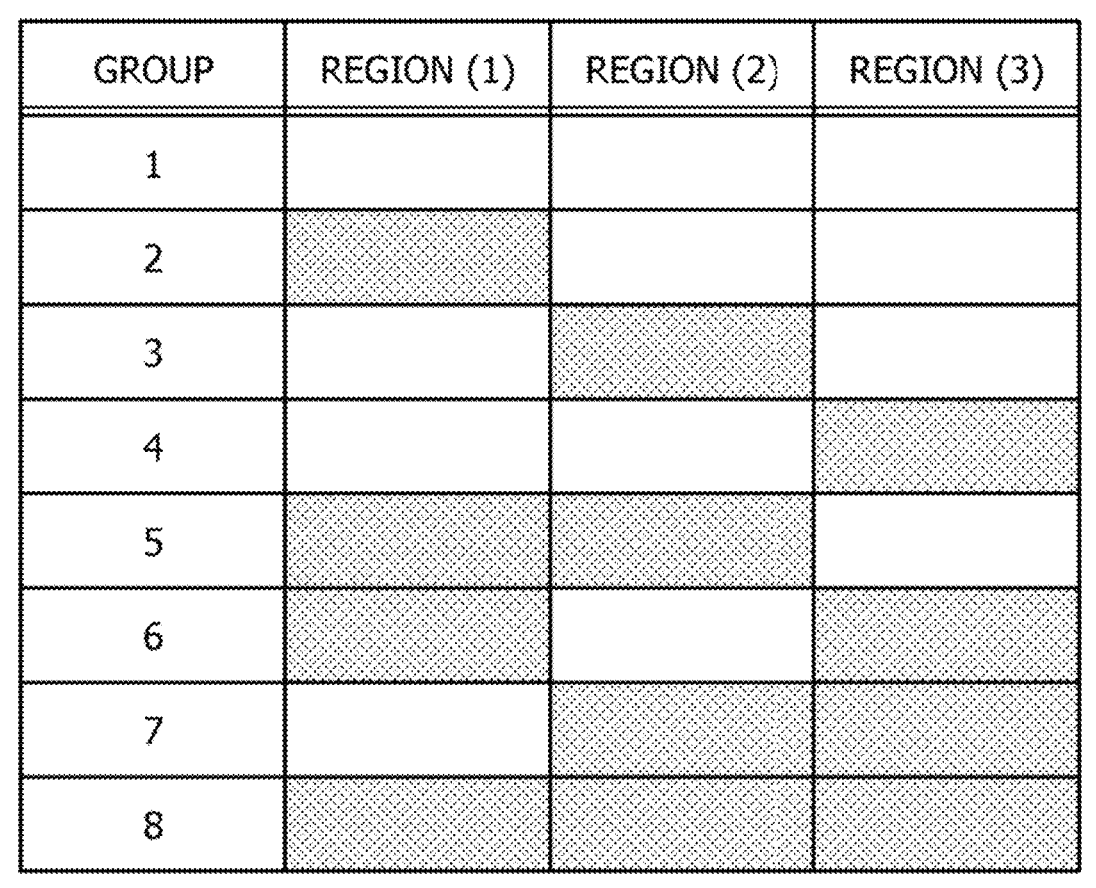

Furthermore, as the gas introduction timing, as illustrated in FIG. 27, the region in which the measuring target gas or the purge gas is introduced is defined out of the three regions of the measurement sequence of the region (1), the region (2), and the region (3) in each of groups 1 to 8. Note that, in FIG. 27, in a case where the measuring target gas is introduced, this is displayed as a dark region.

Then, by combining the UV irradiation timings and the gas introduction timings, as illustrated in FIGS. 28, 30, 32, 34, 36, 38, and 40, a plurality of measurement patterns included in the groups A to G is defined as the measurement patterns.

That is, as a plurality of measurement patterns included in the group A, patterns A-1 to A-8 are defined as illustrated in FIG. 28.

Note that, in FIG. 28, a circle is put in a case where the UV irradiation is performed, and a case of introducing the measuring target gas is displayed as a dark region.

Figure 29:
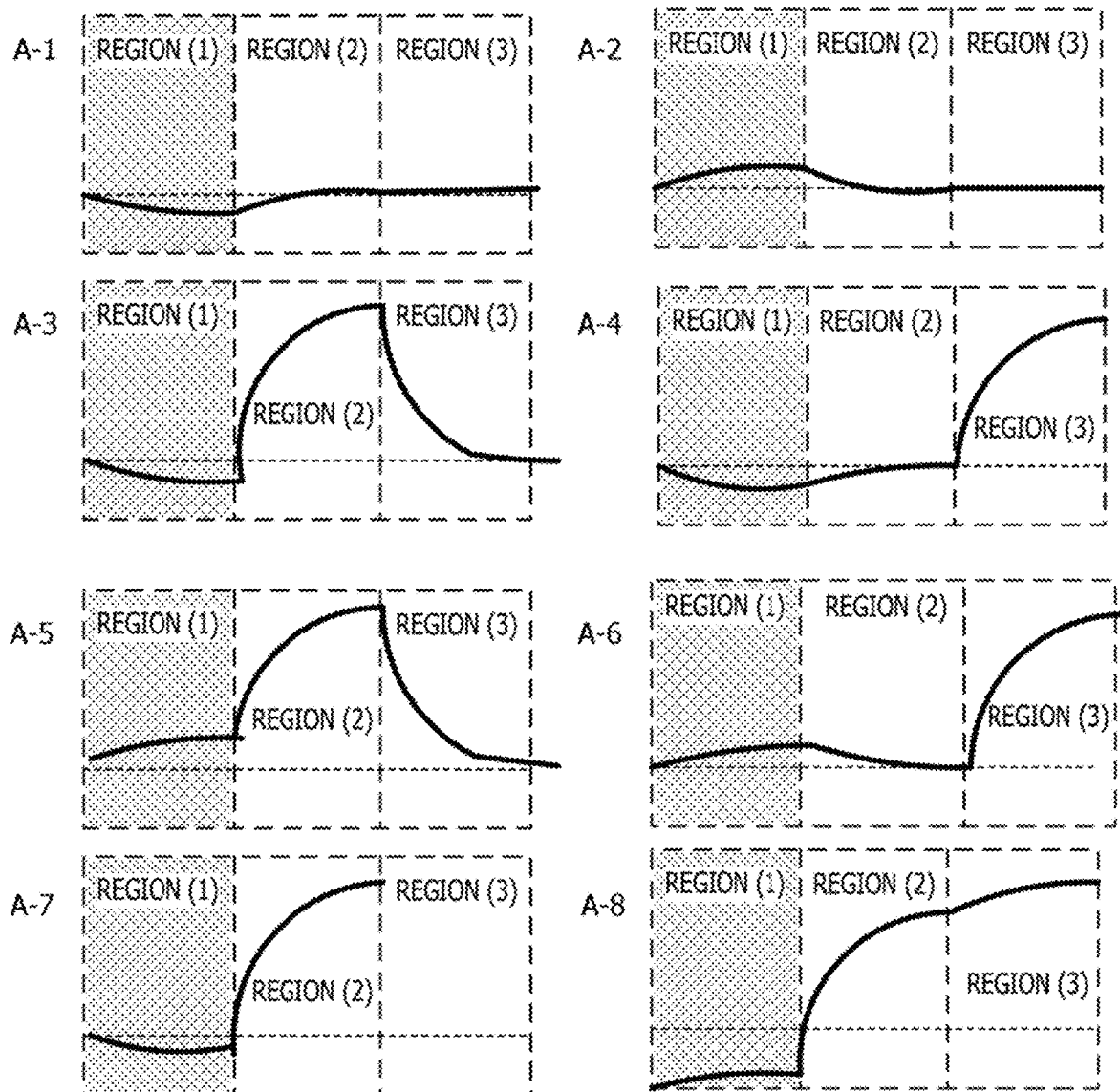
FIG. 29 is a diagram illustrating a sensor response in a plurality of measurement patterns A-1 to A-8 included in the group A which forms the measurement sequence included in the gas concentration measurement sequence of the gas sensor according to this embodiment.

Then, in a case where A-1 to A-8 are specified as the measurement patterns, the sensor response, in other words, the change in resistance value from the gas sensor device 6 in each of the patterns A-1 to A-8 is as illustrated in FIG. 29.

Furthermore, as a plurality of measurement patterns included in the group B, patterns B-1 to B-8 are defined as illustrated in FIG. 30.

Note that, in FIG. 30, a circle is put in a case where the UV irradiation is performed, and a case of introducing the measuring target gas is displayed as a dark region.

Figure 31:
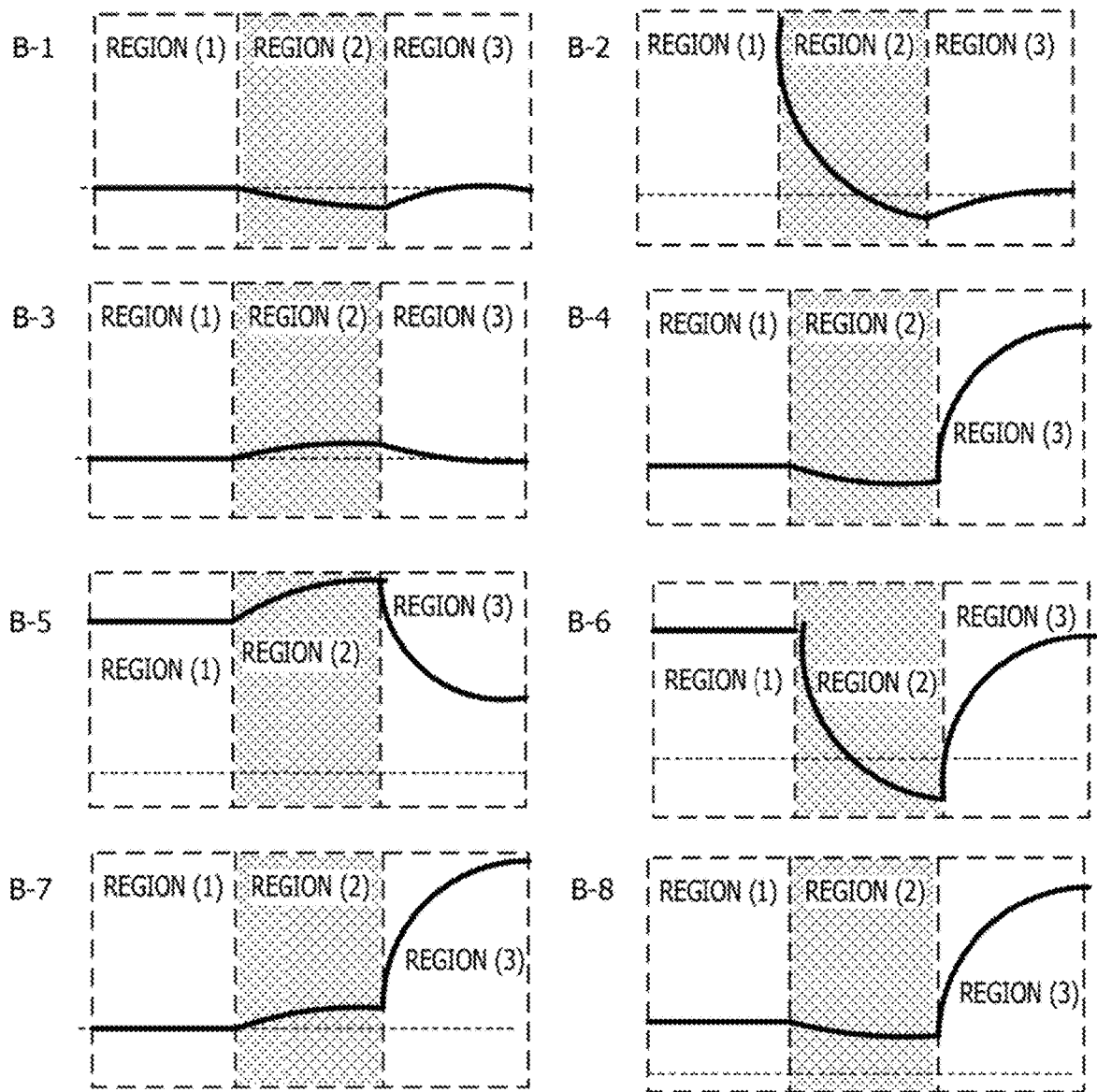
FIG. 31 is a diagram for illustrating a sensor response in a plurality of measurement patterns B-1 to B-8 included in the group B which forms the measurement sequence included in the gas concentration measurement sequence of the gas sensor according to this embodiment.

Then, in a case where B-1 to B-8 are specified as the measurement patterns, the sensor response, in other words, the change in resistance value from the gas sensor device 6 in each of the patterns B-1 to B-8 is as illustrated in FIG. 31.

Furthermore, as a plurality of measurement patterns included in the group C, patterns C-1 to C-8 are defined as illustrated in FIG. 32.

Note that, in FIG. 32, a circle is put in a case where the UV irradiation is performed, and a case of introducing the measuring target gas is displayed as a dark region.

Figure 33:
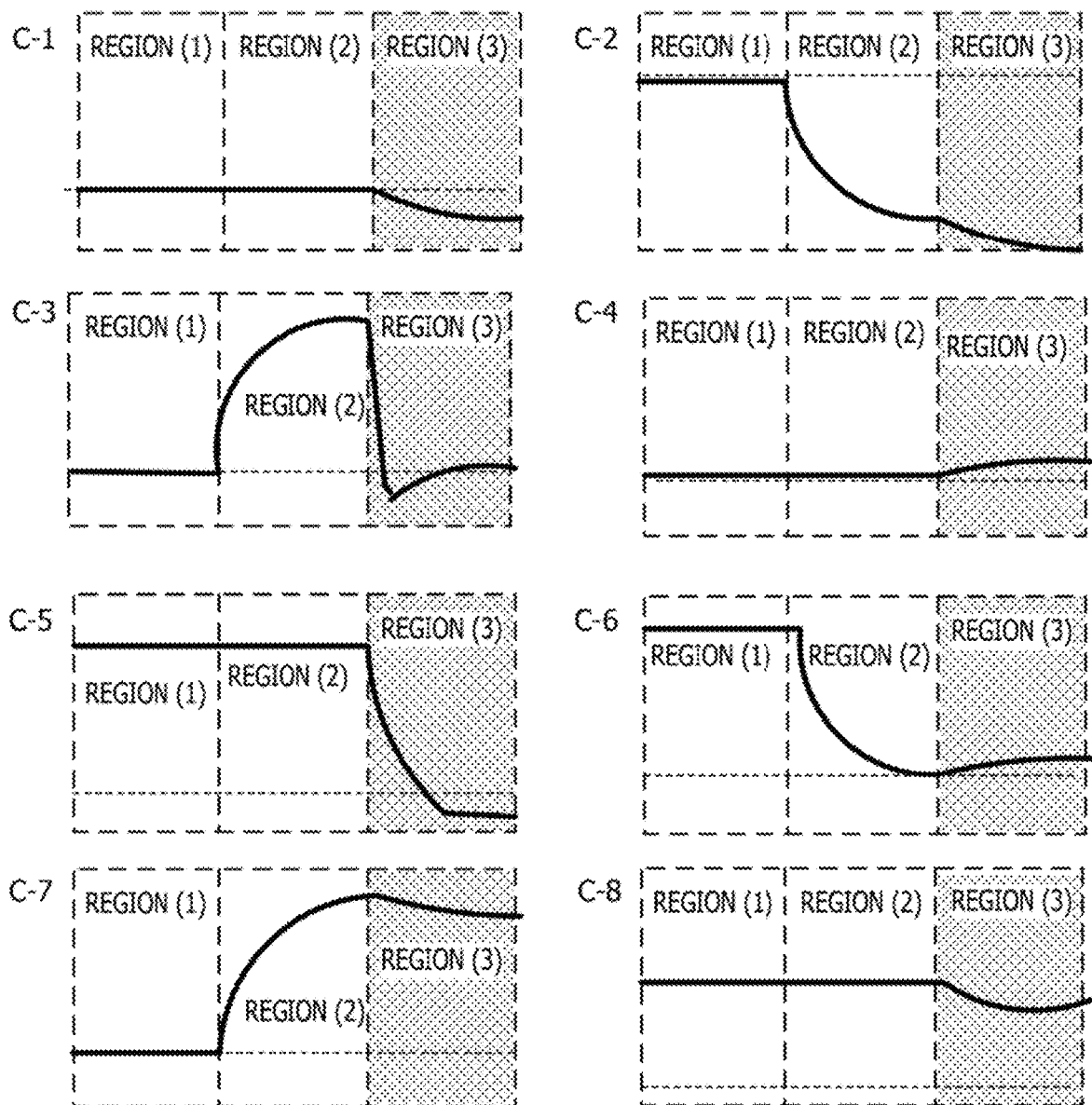
FIG. 33 is a diagram for illustrating a sensor response in a plurality of measurement patterns C-1 to C-8 included in the group C which forms the measurement sequence included in the gas concentration measurement sequence of the gas sensor according to this embodiment.

Then, in a case where C-1 to C-8 are specified as the measurement patterns, the sensor response, in other words, the change in resistance value from the gas sensor device 6 in each of the patterns C-1 to C-8 is as illustrated in FIG. 33.

Furthermore, as a plurality of measurement patterns included in the group D, patterns D-1 to D-8 are defined as illustrated in FIG. 34.

Note that, in FIG. 34, a circle is put in a case where the UV irradiation is performed, and a case of introducing the measuring target gas is displayed as a dark region.

Figure 35:
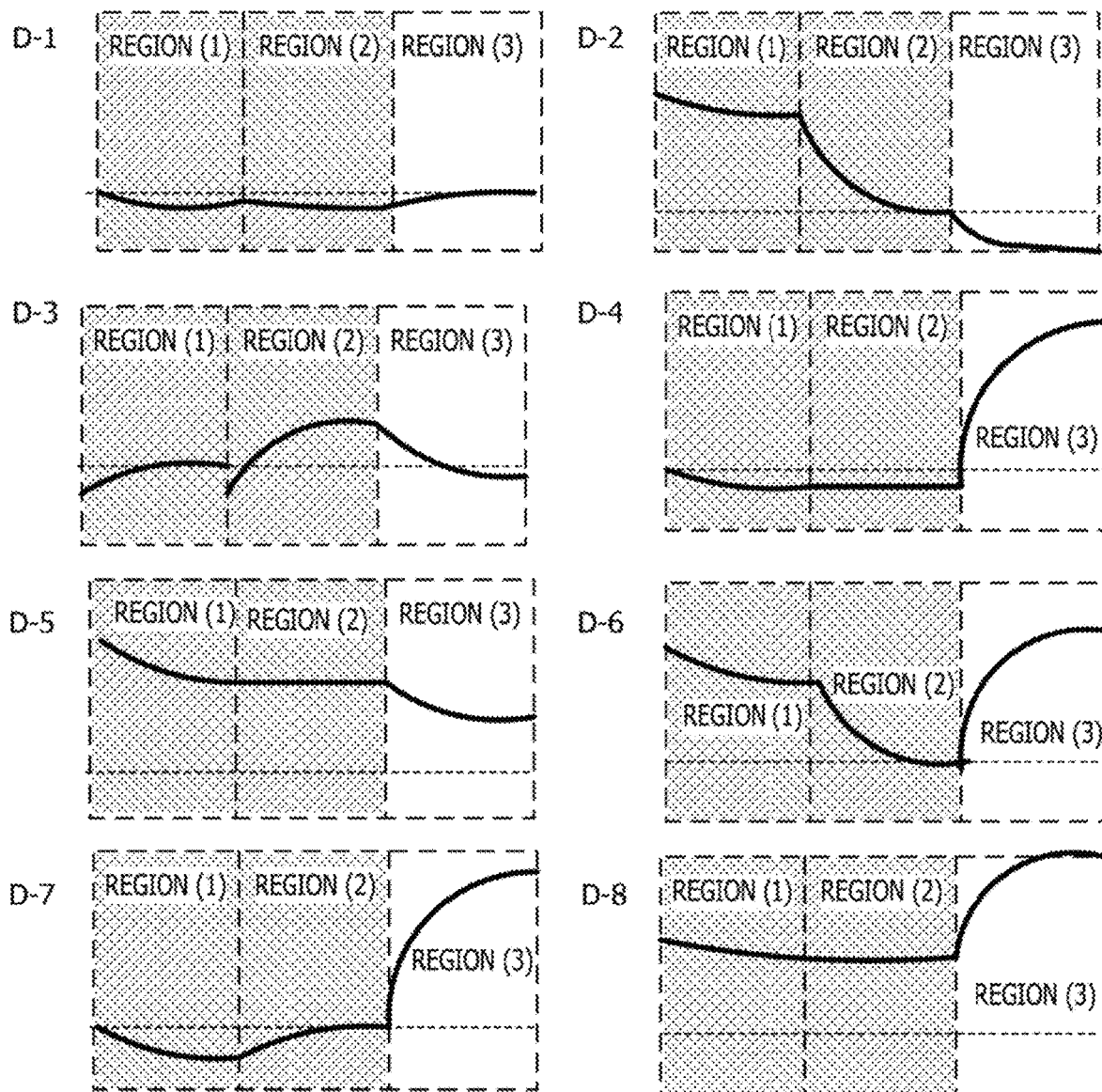
FIG. 35 is a diagram for illustrating a sensor response in a plurality of measurement patterns D-1 to D-8 included in the group D which forms the measurement sequence included in the gas concentration measurement sequence of the gas sensor according to this embodiment.

Then, in a case where D-1 to D-8 are specified as the measurement patterns, the sensor response, in other words, the change in resistance value from the gas sensor device 6 in each of the patterns D-1 to D-8 is as illustrated in FIG. 35.

Furthermore, as a plurality of measurement patterns included in the group E, patterns E-1 to E-8 are defined as illustrated in FIG. 36.

Note that, in FIG. 36, a circle is put in a case where the UV irradiation is performed, and a case of introducing the measuring target gas is displayed as a dark region.

Figure 37:
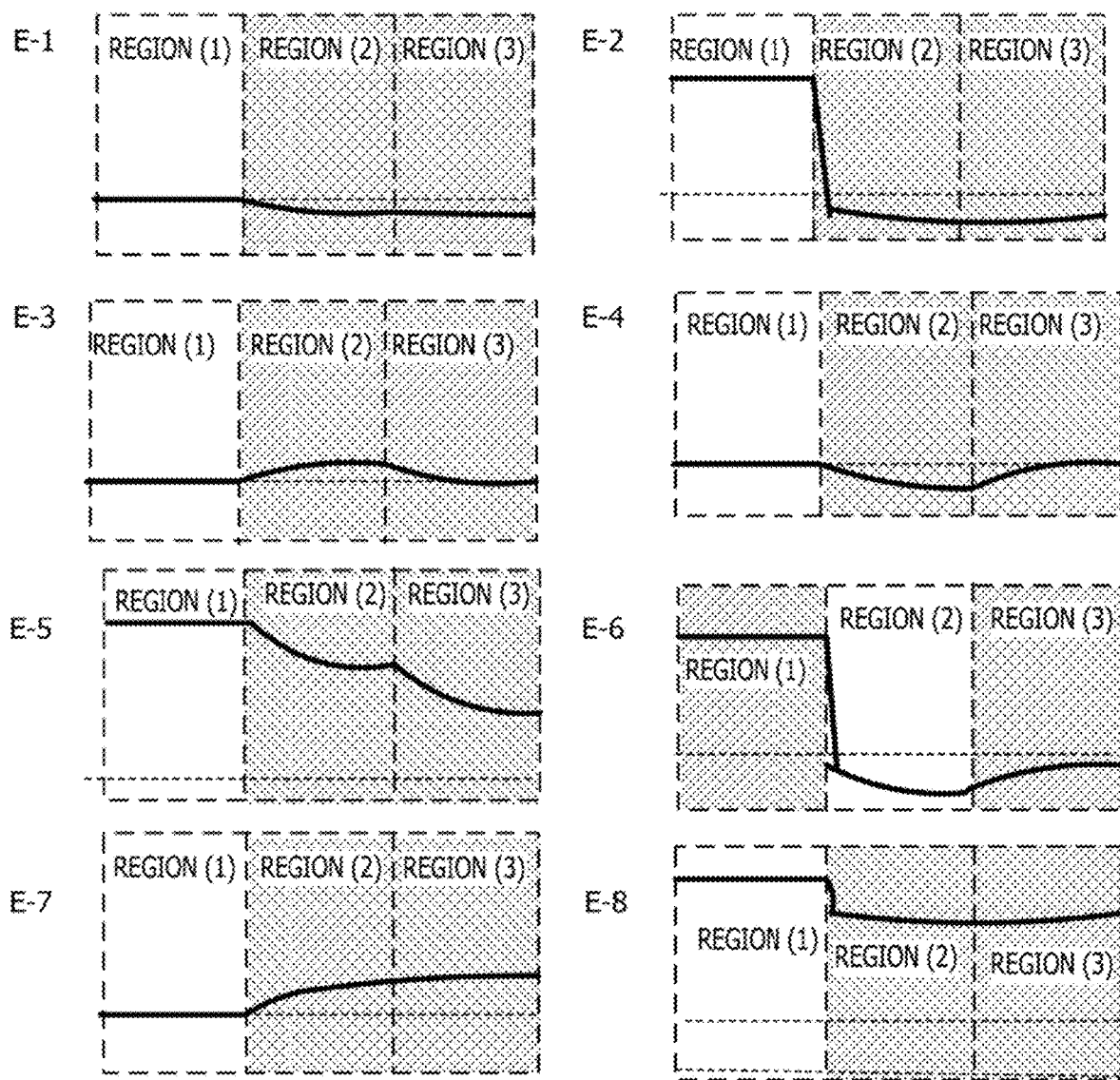
FIG. 37 is a diagram for illustrating a sensor response in a plurality of measurement patterns E-1 to E-8 included in the group E which forms the measurement sequence included in the gas concentration measurement sequence of the gas sensor according to this embodiment.

Then, in a case where E-1 to E-8 are specified as the measurement patterns, the sensor response, in other words, the change in resistance value from the gas sensor device 6 in each of the patterns E-1 to E-8 is as illustrated in FIG. 37.

Furthermore, as a plurality of measurement patterns included in the group F, patterns F-1 to F-8 are defined as illustrated in FIG. 38.

Note that, in FIG. 38, a circle is put in a case where the UV irradiation is performed, and a case of introducing the measuring target gas is displayed as a dark region.

Figure 39:
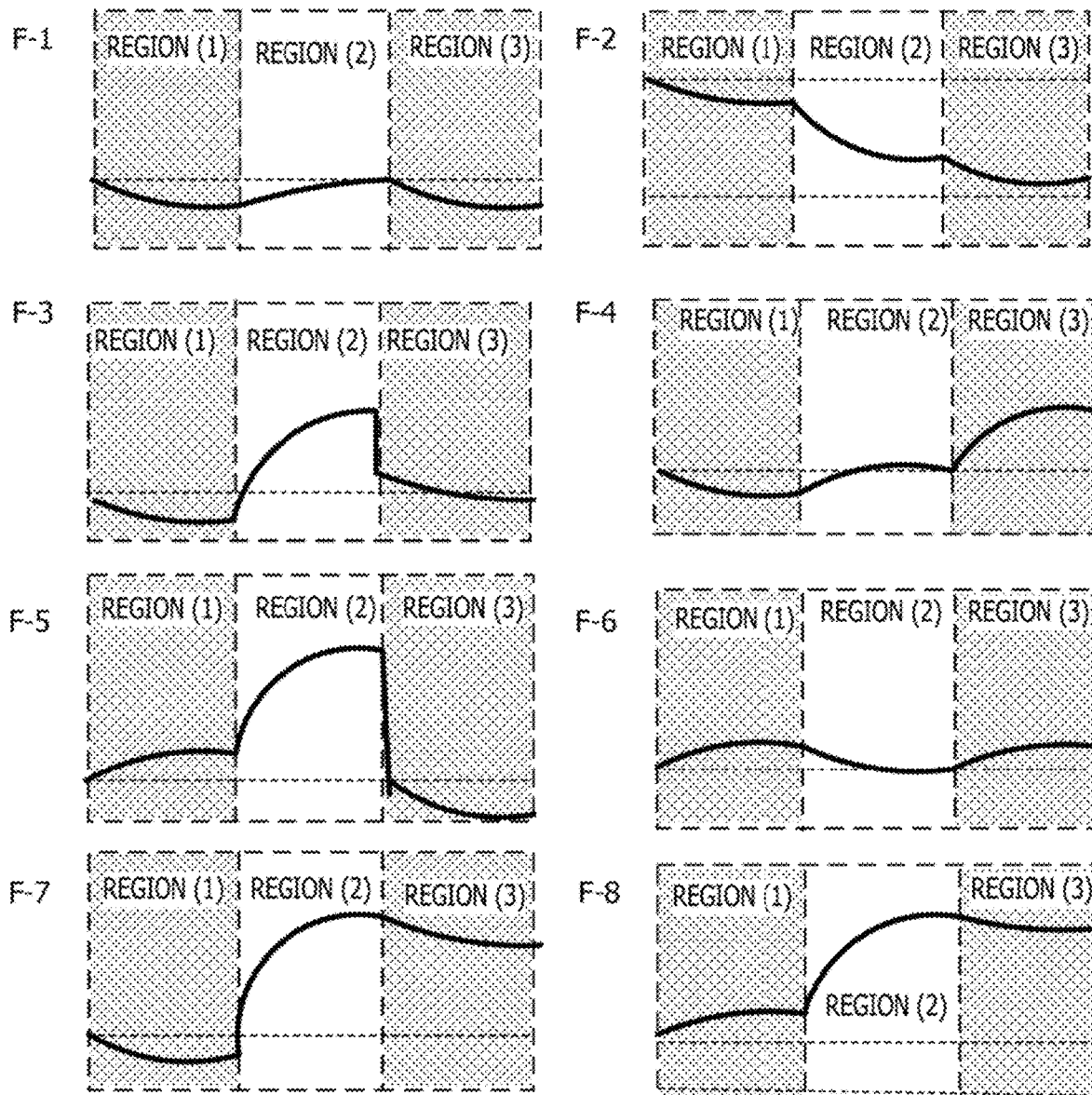
FIG. 39 is a diagram for illustrating a sensor response in a plurality of measurement patterns F-1 to F-8 included in the group F which forms the measurement sequence included in the gas concentration measurement sequence of the gas sensor according to this embodiment.

Then, in a case where F-1 to F-8 are specified as the measurement patterns, the sensor response, in other words, the change in resistance value from the gas sensor device 6 in each of the patterns F-1 to F-8 is as illustrated in FIG. 39.

Furthermore, as a plurality of measurement patterns included in the group G, patterns G-1 to G-8 are defined as illustrated in FIG. 40.

Note that, in FIG. 40, a circle is put in a case where the UV irradiation is performed, and a case of introducing the measuring target gas is displayed as a dark region.

Figure 41:
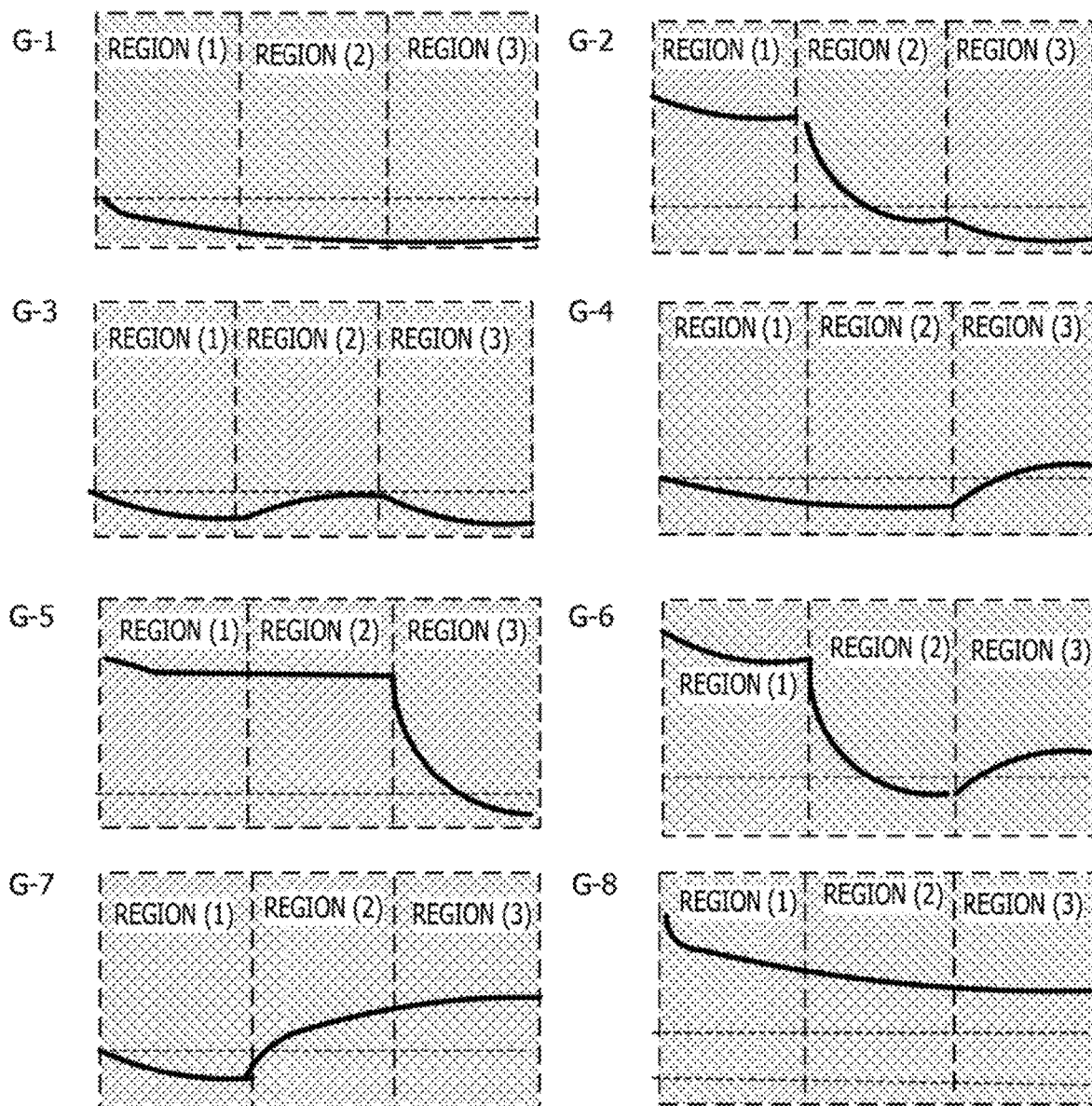
FIG. 41 is a diagram for illustrating a sensor response in a plurality of measurement patterns G-1 to G-8 included in the group G which forms the measurement sequence included in the gas concentration measurement sequence of the gas sensor according to this embodiment.

Then, in a case where G-1 to G-8 are specified as the measurement patterns, the sensor response, in other words, the change in resistance value from the gas sensor device 6 in each of the patterns G-1 to G-8 is as illustrated in FIG. 41.

By the way, in a case where the measurement sequence is executed in the above-described manner, in each measurement pattern, the gas concentration is measured by any one of following concentration measuring methods I to III.

Figure 42:
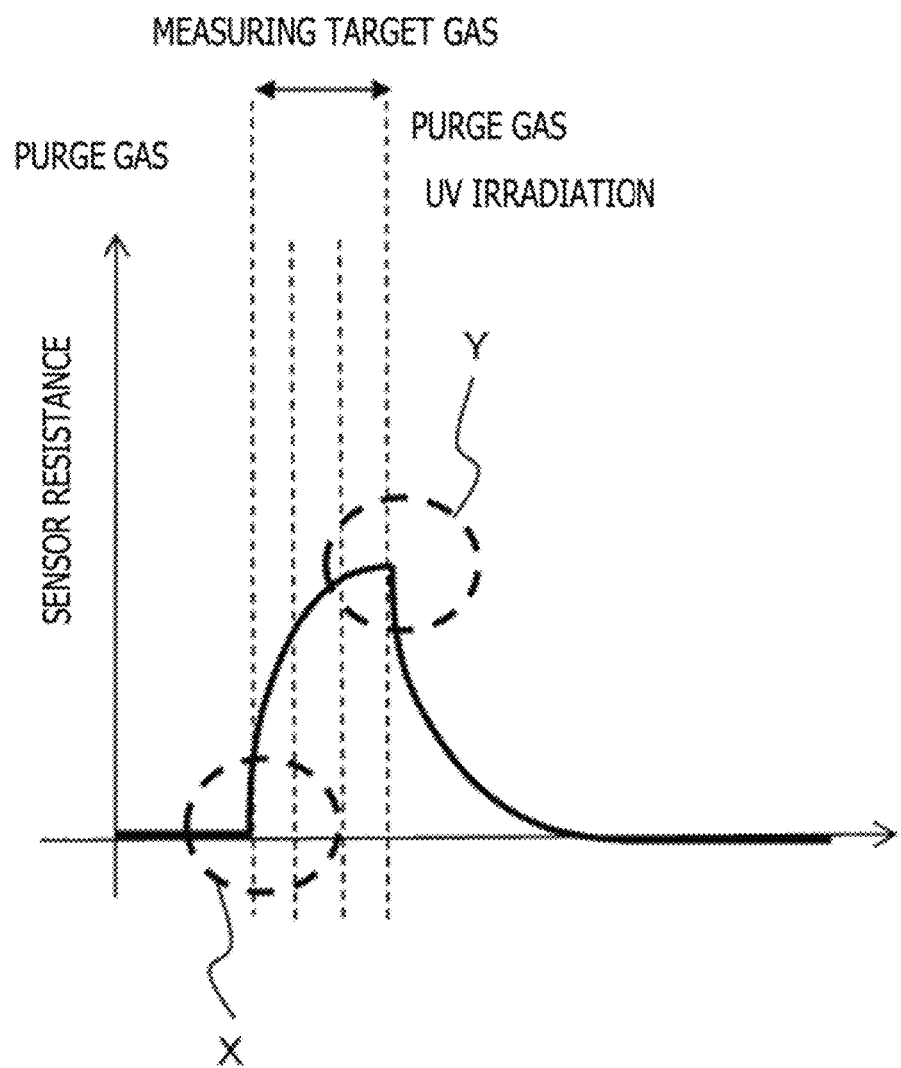
FIG. 42 is a diagram for illustrating a concentration measuring method I in the measurement sequence included in the gas concentration measurement sequence of the gas sensor according to this embodiment.

First, as illustrated in FIG. 42, the concentration measuring method I is a method of measuring the gas concentration by making magnitude of rising of the sensor resistance when it is switched from the purge gas to the measuring target gas correspond to the gas concentration.

For example, in this concentration measuring method I, it is possible to measure the resistance value (sensor resistance) from the gas sensor device 6 at a time point when it is switched from the purge gas to the measuring target gas (refer to a site indicated by a reference sign X in FIG. 42) and make this a reference value.

Then, it is possible to measure the resistance value from the gas sensor device 6 after a predetermined time (fixed time; for example, 60 seconds) elapses from when the supply of the measuring target gas is started (refer to, a site indicated by a reference sign Y in FIG. 42), and obtain a degree of change relative to the reference value, in other words, the magnitude of the sensor response and allow the same to correspond to the gas concentration to measure the gas concentration.

Figure 43:
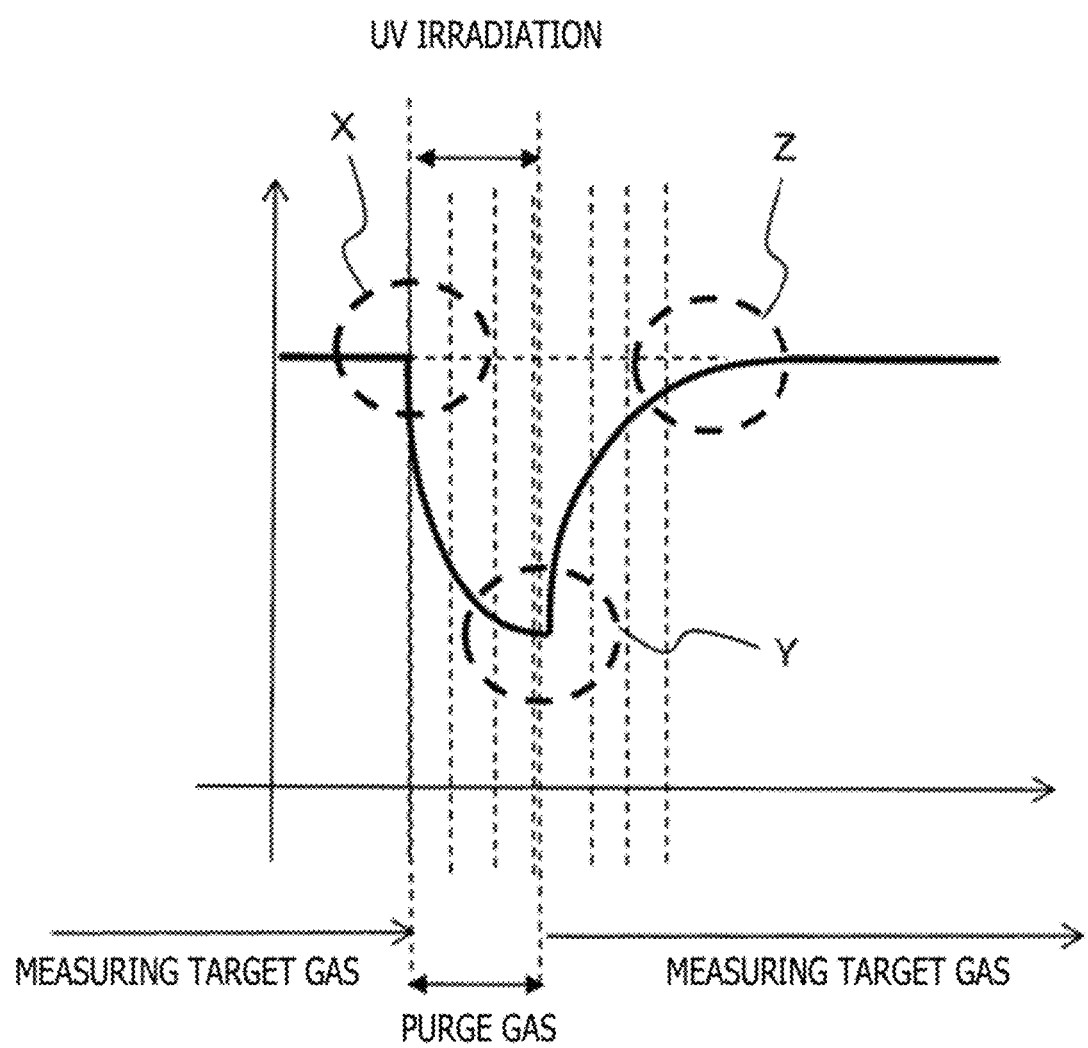
FIG. 43 is a diagram for illustrating concentration measuring methods II and III in the measurement sequence included in the gas concentration measurement sequence of the gas sensor according to this embodiment.

Next, as illustrated in FIG. 43, the concentration measuring method II is a method of measuring the gas concentration by making magnitude of trailing of the sensor resistance at the time of the U irradiation, in other words, trailing of the sensor resistance when it is switched from the measuring target gas to the purge gas and the UV irradiation is performed correspond to the gas concentration.

For example, in this concentration measuring method II, it is possible to measure the resistance value (sensor resistance) from the gas sensor device 6 at a time point when it is switched from the measuring target gas to the purge gas and the UV irradiation is started (refer to a site indicated by a reference sign X in FIG. 43) and use this as a reference value.

Then, it is possible to measure the resistance value from the gas sensor device 6 after a predetermined time (fixed time; for example, 60 seconds) elapses from the start of the supply of the purge gas and the UV irradiation (refer to a site indicated by a reference sign Y in FIG. 43), and obtain a degree of change relative to the reference value, in other words, the magnitude of the sensor response and allow the same to correspond to the gas concentration to measure the gas concentration.

Next, as illustrated in FIG. 43, the concentration measuring method III is a method of measuring the gas concentration by making magnitude of rising of the sensor resistance after the UV irradiation, in other words, the rising of the sensor resistance when it is switched from the purge gas supply and the UV irradiation to the measuring target gas supply and UV non-irradiation correspond to the gas concentration.

For example, in this concentration measuring method III, it is possible to measure the resistance value (sensor resistance) from the gas sensor device 6 at a time point when it is switched from the purge gas to the measuring target gas and from the UV irradiation to the UV non-irradiation (refer to a site indicated by a reference sign Y in FIG. 43) and use this as a reference value.

Then, it is possible to measure the resistance value from the gas sensor device 6 after a predetermined time (fixed time; for example, 60 seconds) elapses from a time point when it is switched from the purge gas to the measuring target gas and from the UV irradiation to the UV non-irradiation (refer to, a site indicated by a reference sign Z in FIG. 43), and obtain a degree of change relative to the reference value, in other words, the magnitude of the sensor response and allow the same to correspond to the gas concentration to measure the gas concentration.

In the concentration measuring methods II and III described above, the UV irradiation is performed for a predetermined time from a state in which the sensitive film 9 (refer to, for example, FIG. 7) of the gas sensor device 6 is exposed to the measuring target gas.

In this case, the control unit 17 provided on the gas sensor 5 controls the light source 10 (here, the UV light source) to irradiate the sensitive film 9 of the gas sensor device 6 with light for a predetermined time (first predetermined time).

Then, in the above-described concentration measuring method II, the control unit 17 provided on the gas sensor 5 measures the concentration of the measuring target gas based on the resistance value from the gas sensor device 6 detected when the supply of the measuring target gas stops and the resistance value from the gas sensor device 6 detected when the irradiation of the sensitive film 9 with light ends.

Furthermore, in the above-described concentration measuring method III, the control unit 17 provided on the gas sensor 5 measures the concentration of the measuring target gas based on the resistance value from the gas sensor device 6 detected at the end of the light irradiation to the sensitive film 9 of the gas sensor device 6 and the resistance value from the gas sensor device 6 detected after a predetermined time (second predetermined time) from the end of the light irradiation to the sensitive film 9.

Note that, in a case where the gas concentration is measured by the above-described concentration measuring methods I to III, the resistance value serving as the reference value is stored in the storage unit 24 provided on the control unit 17, for example. Furthermore, it is possible to store an expression for converting the magnitude of the sensor response into the gas concentration in advance in, for example, the storage unit 24 provided on the control unit 17, and calculate the gas concentration based on the expression in each of the above-described concentration measuring methods I to III. Furthermore, in case where the gas sensor 5 is provided with the above-described non-volatile memory 26 (for example, refer to FIG. 18), it is possible to store a calculation expression of the gas concentration in the non-volatile memory 26 and the MPU 25 provided on the control unit 17 may calculate the gas concentration based on this.

Next, the stop sequence is a sequence for removing the gas molecules (adsorbate) adsorbed to the surface of the sensitive film 9 (refer to, for example, FIG. 7) of the gas sensor device 6 before the operation is completely stopped and ventilating the inside of the sensor chamber 18.

Therefore, the surface of the sensitive film 9 of the gas sensor device 6 and its surroundings may be recovered to a clean state.

Parameters set in advance of this stop sequence include full time, UV irradiation timing and time, pump operation timing and time, solenoid valve switching timing and time, and the like.

Figure 44:
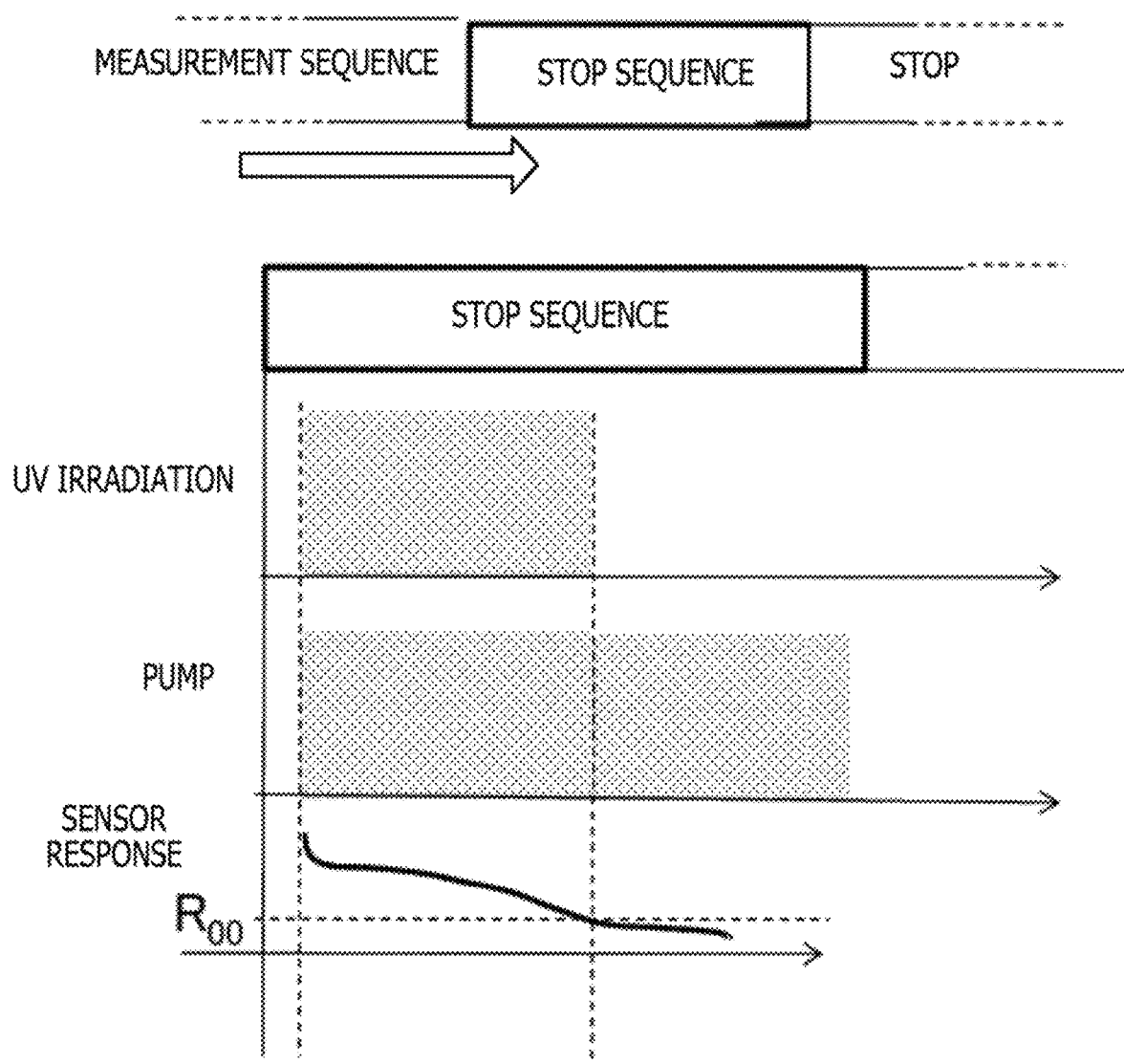
FIG. 44 is a diagram for illustrating a stop sequence included in the gas concentration measurement sequence of the gas sensor according to this embodiment.

In the stop sequence, as illustrated in FIG. 44, the sensor resistance, in other words, the resistance value from the gas sensor device 6 at the time of starting or measurement start is set to $R_{00}$, and the UV irradiation is performed to a time point when the resistance value from the gas sensor device 6 becomes $R_{00}$ or smaller, or the resistance value from the gas sensor device 6 becomes smaller than $R_{00}$.

Note that, the sensor resistance at the time of starting is, for example, the sensor resistance in the start sequence, and the sensor resistance at the time of measurement start is, for example, the sensor resistance in the region (1) of the measurement sequence.

Here, the purge gas is introduced at the same time as the UV irradiation. For example, the purge gas is introduced by operating the pump 16 (20) in a state in which the solenoid valve 13 (21) is switched to the path through the filter 14 (22).

Then, also after the resistance value from the gas sensor device 6 becomes $R_{00}$ or smaller and the UV irradiation is stopped, the purge gas continuously flows, and after a time sufficiently longer than the UV irradiation time (for example, about twice the UV irradiation time) elapses, the pump 16 (20) is stopped to stop the introduction of the purge gas.

Figure 45:
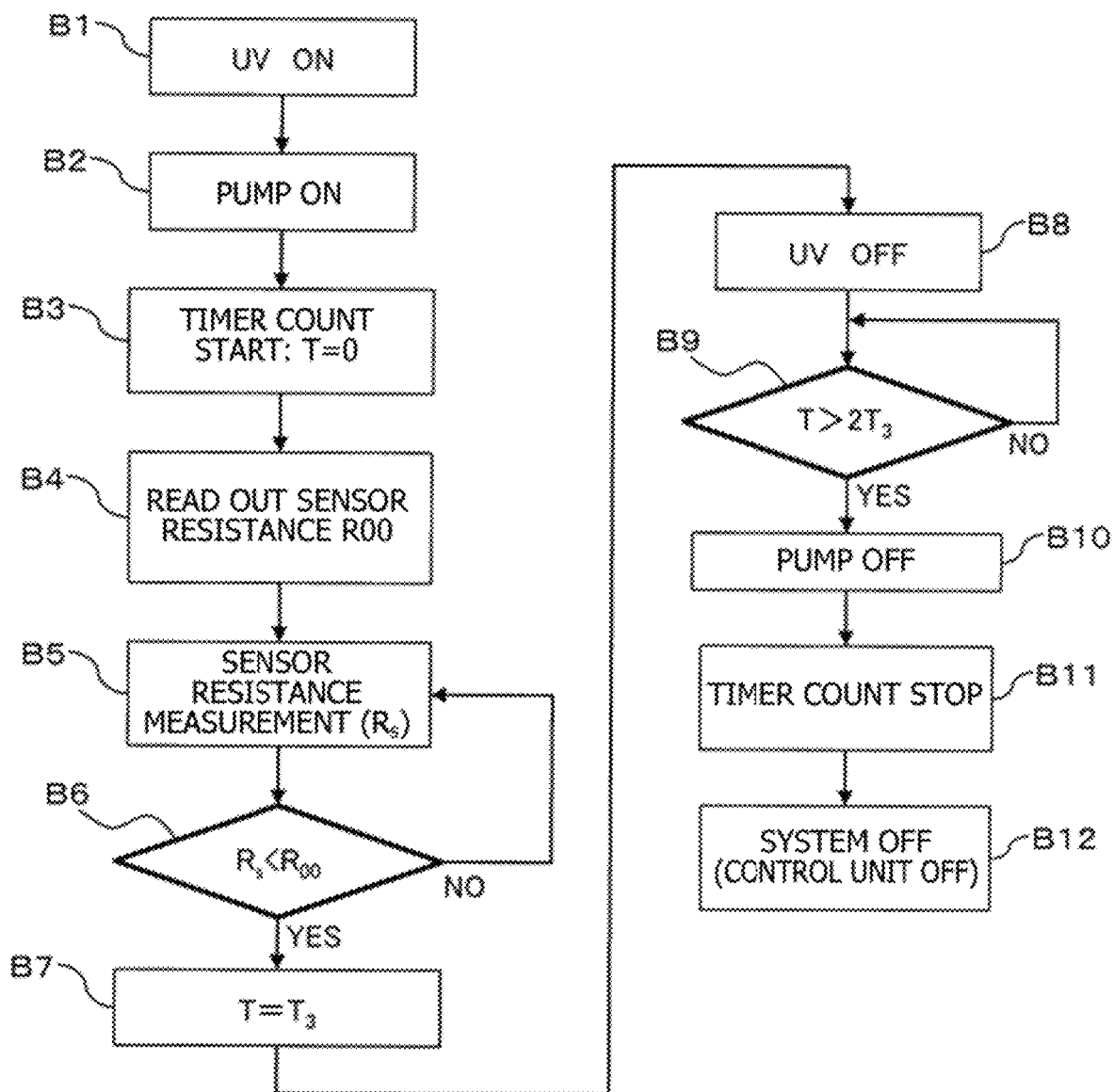
FIG. 45 is a flowchart for illustrating a process in the stop sequence included in the gas concentration measurement sequence of the gas sensor according to this embodiment.

Here, FIG. 45 is a flowchart illustrating a process in a case where such stop sequence is realized by execution of the program by the control unit 17 provided on the gas sensor 5.

First, the control unit 17 turns on the light source (here, UV-LED) 10 (step B1), turns on the pump 16 (step B2), and starts the timer (step B3). Note that, a timer count starts at T=0.

Therefore, the pump 16 (20) operates in a state in which the light (herein, UV) is applied to the sensitive film 9 of the gas sensor device 6 and the solenoid valve 13 (21) is switched to the path through the filter 14 (22), so that the purge gas is introduced.

In this state, the control unit 17 reads out the sensor resistance, in other words, the resistance value $R_{00}$ from the gas sensor device 6 at the time of starting or measurement start from a storage unit such as a memory, for example (step B4).

Then, the control unit 17 continues the UV irradiation and the introduction of the purge gas until the resistance value $R_S$ from the gas sensor device 6 becomes smaller than $R_{00}$ while monitoring the sensor resistance, in other words, the resistance value $R_S$ from the gas sensor device 6 (steps B5 and B6).

That is, the control unit 17 measures the sensor resistance, in other words, the resistance value $R_S$ from the gas sensor device 6 (step B5), and determines whether the measured resistance value $R_S$ becomes smaller than $R_{00}$ (step B6).

Then, as a result of this determination, in a case where it is not determined that the measured resistance value $R_S$ becomes smaller than $R_{00}$, the procedure shifts to a NO route, and the processes at steps B5 and B6 are repeated.

In contrast, in a case where it is determined that the measured resistance value $R_S$ becomes smaller than $R_{00}$, the procedure shifts to a YES route, and the control unit 17 stores a count value $T_3$ of the timer at that time as the UV irradiation time (step B7), and turns off the light source (here, UV-LED) 10 (step B8).

Then, after stopping the UV irradiation, the control unit 17 continuously flows the purge gas until a time ($2T_3$) twice the UV irradiation time elapses, and when the time ($2T_3$) twice the UV irradiation time elapses, this turns off the pump 16 (20) to stop the introduction of the purge gas (steps B9 and B10).

That is, the control unit 17 determines whether the count value T of the timer becomes greater than $2T_3$ (step B9), and as a result of this determination, in a case where this does not determine that the count value T of the timer is greater than $2T_3$, this shifts to a NO route and repeat this determination.

In contrast, in a case where the control unit 17 determines that the count value T of the timer become larger than $2T_3$, this shifts to a YES route, turns off the pump 16 (20), and stops the introduction of the purge gas (step B10).

Thereafter, the control unit 17 stops the timer count (step B11) to be turned off, and the gas sensor (gas sensor system) 5 is turned on (step B12).

When performing such control, the control unit 17 provided on the gas sensor 5 controls the purge gas supply mechanisms 13 and 14 (21 and 22) to supply the purge gas until the resistance value from the gas sensor device 6 reaches an initial value and controls the light source 10 to irradiate the sensitive film 9 with light after the measurement ends, ends the control to the light source 10 when the resistance value from the gas sensor device 6 reaches the initial value, and continues the control to the purge gas supply mechanisms 13 and 14 (21 and 22) for a certain time, and thereafter controls to stop the operation.

Note that the present invention is not limited to the configuration described in the embodiment and each variation described above, and various modifications may be made without departing from the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A gas sensor comprising:
    a gas sensor device provided with a first electrode, a second electrode, and a sensitive film that connects the first electrode to the second electrode;
    a light source that irradiates the sensitive film with light, wherein the sensitive film is made of cuprous bromide, and the cuprous bromide expresses a photocatalytic property of decomposing a substance brought into contact with the cuprous bromide by light applied from the light source; and
    a control unit that:
        measures a concentration of a measuring target gas based on a value detected by the gas sensor device in a case where the measuring target gas is supplied and also controls the light source,
        controls a gas supply timing and a gas supply tune for supplying the measuring target gas, and also controls a light irradiation timing and a light irradiation time for irradiating the sensitive film with light from the light source,
        controls the light source to irradiate the sensitive film with light at a timing at which the supply of the measuring target gas is stopped, and
        controls the light source to irradiate the sensitive film with light until a resistance value returns to a resistance value from the gas sensor device detected when the supply of the measuring target gas is started.

2. The gas sensor according to claim 1, wherein the light source is a light source that applies light including a wavelength component in a near-ultraviolet light region.

3. The gas sensor according to claim 1, wherein the control unit controls the light source to irradiate the sensitive film with light for a first predetermined time.

4. The gas sensor according to claim 3, wherein the control unit measures the concentration of the measuring target gas based on a resistance value from the gas sensor device detected when the supply of the measuring target gas is stopped and the resistance value from the gas sensor device detected at the end of the light irradiation to the sensitive film.

5. The gas sensor according to claim 3, wherein the control unit measures the concentration of the measuring target gas based on a resistance value from the gas sensor device detected at the end of the light irradiation to the sensitive film and the resistance value from the gas sensor device detected after a second predetermined time from the end of the light irradiation to the sensitive film.

6. The gas sensor according to claim 1, wherein the control unit measures the concentration of the measuring target gas based on the resistance value from the gas sensor device detected when the supply of the measuring target gas is started and the resistance value from the gas sensor device detected when the measuring target gas is supplied for a predetermined time.

7. The gas sensor according to claim 1, comprising: a purge gas supply mechanism that supplies purge gas in place of the measuring target gas, wherein the control unit controls a purge gas supply timing and a purge gas supply time for supplying the purge gas.

8. The gas sensor according to claim 7, wherein the control unit executes a measurement sequence for measuring the concentration of the measuring target gas while dividing the sequence into a first region, a second region, and a third region, a specified pattern out of a plurality of patterns obtained by combining measuring target gas supply control, purge gas supply control, and light irradiation control is executed in the first region, second region, and third region, and the concentration of the measuring target gas is measured based on a value detected by the gas sensor device in the second region.

9. The gas sensor according to claim 7, wherein the control unit controls the purge gas supply mechanism to supply the purge gas until the resistance value from the gas sensor device reaches an initial value and controls the light source to irradiate the sensitive film with light after the measurement ends, ends the control to the light source when the resistance value from the gas sensor device reaches the initial value, and continues the control to the purge gas supply mechanism for a certain time, and thereafter controls to stop operation.

10. The gas sensor according to claim 1, wherein the control unit controls the light source to irradiate the sensitive film with light, controls the light source to irradiate the sensitive film with light while supplying the measuring target gas, or controls light source to irradiate the sensitive film with light and controls the light source to irradiate the sensitive film with light while supplying the measuring target gas at the time of starting before the measurement is started.

* * * * *